United States Patent
Gheorghiu et al.

(10) Patent No.: US 10,455,468 B2
(45) Date of Patent: Oct. 22, 2019

(54) MOBILITY ENHANCEMENTS FOR HIGH SPEED SCENARIOS

(71) Applicant: QUALCOMM Incorporated, San Diego, CA (US)

(72) Inventors: Valentin Alexandru Gheorghiu, Tokyo (JP); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 15/236,251

(22) Filed: Aug. 12, 2016

(65) Prior Publication Data

US 2017/0048772 A1 Feb. 16, 2017

Related U.S. Application Data

(60) Provisional application No. 62/205,236, filed on Aug. 14, 2015.

(51) Int. Cl.
*H04W 36/14* (2009.01)
*H04L 5/00* (2006.01)
(Continued)

(52) U.S. Cl.
CPC .......... *H04W 36/14* (2013.01); *H04L 5/0007* (2013.01); *H04L 43/08* (2013.01);
(Continued)

(58) Field of Classification Search
CPC . H04W 36/14; H04W 76/28; H04W 52/0254; H04W 52/0209; H04W 36/0088;
(Continued)

(56) References Cited

U.S. PATENT DOCUMENTS

2010/0298001 A1  11/2010  Dimou et al.
2011/0269462 A1  11/2011  Saegfors et al.
(Continued)

FOREIGN PATENT DOCUMENTS

GB        2358550 A        7/2001

OTHER PUBLICATIONS

NTT DoCoMo, "UE Measurement Requirement in LTE", R2-070275, Jan. 15-19, 2007. (From Applicant's IDS Feb. 8, 2017).*
(Continued)

*Primary Examiner* — Mang Hang Yeung
(74) *Attorney, Agent, or Firm* — Holland & Hart LLP/QUALCOMM Incorporated

(57) ABSTRACT

Techniques are provided for adaptively changing a periodicity of measuring signal characteristics for a UE in a relatively high speed environment based on one or more signal characteristics being outside of a threshold. Periodicity of measuring signal characteristics may be made directly by changing an interval at which measurements are taken. In certain examples, periodicity of measuring signal characteristics may be made indirectly by changing the length of a discontinuous reception (DRX) cycle. Some techniques provide one or more radio link monitoring (RLM) parameters may be modified based on a determination that a UE is in a high speed environment or measured signal characteristics are outside of a threshold.

30 Claims, 17 Drawing Sheets

(51) Int. Cl.
*H04L 12/26* (2006.01)
*H04W 36/30* (2009.01)
*H04W 36/00* (2009.01)
*H04W 52/02* (2009.01)
*H04W 76/28* (2018.01)
*H04W 88/02* (2009.01)
*H04W 88/08* (2009.01)
*H04W 36/08* (2009.01)

(52) U.S. Cl.
CPC ....... *H04W 36/0088* (2013.01); *H04W 36/30* (2013.01); *H04W 52/0209* (2013.01); *H04W 52/0254* (2013.01); *H04W 76/28* (2018.02); *H04W 36/08* (2013.01); *H04W 88/02* (2013.01); *H04W 88/08* (2013.01); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/24* (2018.01)

(58) Field of Classification Search
CPC ..... H04W 36/30; H04W 36/08; H04W 88/08; H04W 88/02; H04L 43/08; H04L 5/0007; Y02D 70/1264; Y02D 70/142; Y02D 70/1242; Y02D 70/24; Y02D 70/1262; Y02D 70/00; Y02D 70/146

USPC ........................................................ 370/332
See application file for complete search history.

(56) References Cited

U.S. PATENT DOCUMENTS

| 2014/0241227 A1* | 8/2014 | Wu ................... H04W 52/0216 370/311 |
| 2014/0247742 A1 | 9/2014 | Lee et al. |
| 2015/0163745 A1* | 6/2015 | Kim ................... H04W 52/0235 370/311 |
| 2018/0049269 A1* | 2/2018 | Fujishiro ............... H04W 76/28 |

OTHER PUBLICATIONS

ISA/EP, International Search Report and Written Opinion of the International Searching Authority, Int'l Application No. PCT/US20/6/046946, dated Oct. 24, 2016, European Patent Office, Rijswijk, NL, 22 pgs.

NTT DOCOMO, "UE Measurement Requirements in LTE", 3GPP TSG-RAN WG2 Meeting #56bis, R2-070275, Sorrento, Italy, Jan. 15-19, 2007, 2 pgs., XP050133364, 3rd Generation Partnership Project.

* cited by examiner

MOBILITY ENHANCEMENTS FOR HIGH SPEED SCENARIOS

CROSS REFERENCES

The present application for patent claims priority to U.S. Provisional Patent Application No. 62/205,236 by Gheorghiu, et al., entitled "Mobility Enhancements For High Speed Scenarios," filed Aug. 14, 2015, assigned to the assignee hereof.

BACKGROUND

Field of the Disclosure

The following relates generally to wireless communication, and more specifically to techniques mobility enhancements for wireless communications systems that support high speed deployments.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

In some cases, a wireless system may include one or more UEs that move at a relatively high rate of speed. For example, one or more base stations may have a high speed rail line within their coverage area. In some cases, handover between base stations for UEs that are traveling at relatively high rates of speed may be initiated after a signal from a serving base station has dropped sufficiently to cause a radio link failure (RLF).

SUMMARY

The present disclosure, for example, relates to one or more techniques for adaptively changing a periodicity of measuring signal characteristics for a UE in a relatively high speed environment based on one or more signal characteristics being outside of a threshold. In some examples periodicity of measuring signal characteristics may be made directly by changing an interval at which measurements are taken if the one or more signal characteristics are outside of the threshold. In certain examples, periodicity of measuring signal characteristics may be made indirectly by changing the length of a discontinuous reception (DRX) cycle. Additionally or alternatively, one or more radio link monitoring (RLM) parameters may be modified based on a determination that a UE is in a high speed environment or measured signal characteristics are outside of a threshold.

In some examples, a base station may configure a measurement parameter threshold on which a user equipment (UE) may change an interval at which it performs measurements or may change the length of a DRX cycle. For example, a reference signal received power (RSRP) parameter of a serving base station may be measured by a UE, and if the measured RSRP is above the configured measurement parameter threshold, the UE may use a first interval for signal characteristic measurements or DRX cycle. If the measured RSRP is below the configured measurement parameter threshold, the UE may change to a second time interval for the signal characteristic measurements or DRX cycle. In some examples, a UE may, additionally or alternatively, change a radio link monitoring (RLM) parameter based on a measured signal characteristic to trigger a connection re-establishment more quickly. In some examples, the measurement parameter threshold may be set as a last RSRP measurement of a UE prior to hand over from a prior base station.

The measurement parameter threshold may be configured by a serving base station of another node of a wireless communications network. In some examples, a UE may signal the network it switched DRX cycles. In certain examples, a UE may autonomously change the DRX cycle length or the interval at which it performs measurements. A UE may be signaled enable changing the DRX cycle length or the intervals at which it performs measurements in the event that the UE determines that it is in a high speed deployment. A determination of being in a high speed deployment may be based on, for example, a number of cells visited in a certain amount of time, or speed estimation from position measurements.

A method of wireless communication is described. The method may include identifying a first time interval for performing one or more signal characteristic measurements, determining that a mobility parameter is outside of a mobility parameter threshold, and changing, responsive to the determining, to a second time interval for performing the one or more signal characteristic measurements, wherein the second time interval is shorter than the first time interval.

An apparatus for wireless communication is described. The apparatus may include means for identifying a first time interval for performing one or more signal characteristic measurements, means for determining that a mobility parameter is outside of a mobility parameter threshold, and means for changing, responsive to the determining, to a second time interval for performing the one or more signal characteristic measurements, wherein the second time interval is shorter than the first time interval.

A further apparatus for wireless communication is described. The apparatus may include a processor, memory in electronic communication with the processor, and instructions stored in the memory and operable, when executed by the processor, to cause the apparatus to identify a first time interval for performing one or more signal characteristic measurements, determine that a mobility parameter is outside of a mobility parameter threshold, and change, responsive to the determining, to a second time interval for performing the one or more signal characteristic measurements, wherein the second time interval is shorter than the first time interval.

A non-transitory computer-readable medium storing code for wireless communication is described. The code may include instructions executable to identify a first time interval for performing one or more signal characteristic measurements, determine that a mobility parameter is outside of a mobility parameter threshold, and change, responsive to the determining, to a second time interval for performing the one or more signal characteristic measurements, wherein the second time interval is shorter than the first time interval.

Some examples of the method, apparatuses, or non-transitory computer-readable medium described herein may further include processes, features, means, or instructions for changing to a second time interval comprises changing a discontinuous reception (DRX) cycle from a first periodicity corresponding to the first time interval to a second periodicity corresponding to the second time interval. Additionally or alternatively, in some examples the one or more signal characteristic measurements comprise one or more reference signal receive power (RSRP) measurements.

In some examples of the method, apparatuses, or non-transitory computer-readable medium described herein, the one or more signal characteristic measurements comprise one or more measurements associated with a radio link monitoring (RLM) process. Additionally or alternatively, in some examples the radio link monitoring (RLM) process comprises evaluating a link quality of a link with a serving base station to trigger a connection re-establishment following a determination that the link quality is below a RLM threshold.

In some examples of the method, apparatuses, or non-transitory computer-readable medium described herein, the changing from the first time interval to the second time interval is performed autonomously by the UE. Additionally or alternatively, some examples may include processes, features, means, or instructions for transmitting a signal to a serving base station that the second time interval is being used for performing the one or more signal characteristic measurements.

Some examples of the method, apparatuses, or non-transitory computer-readable medium described herein may further include processes, features, means, or instructions for transmitting a signal to a serving base station that a discontinuous reception (DRX) cycle periodicity is changed at the UE. Additionally or alternatively, some examples may include processes, features, means, or instructions for triggering a handover from a serving base station to a target base station responsive to the one or more signal characteristic measurements.

In some examples of the method, apparatuses, or non-transitory computer-readable medium described herein, the mobility parameter threshold is based at least in part on one or more of a speed of the UE, a variation in received signal reference power (RSRP) measurements, or a number of visited cells within a time period. Additionally or alternatively, in some examples the mobility parameter threshold, the first time interval, and the second time interval are received in signaling from a base station.

Some examples of the method, apparatuses, or non-transitory computer-readable medium described herein may further include processes, features, means, or instructions for receiving signaling from a serving base station that the UE is in a high speed deployment, and performing the establishing, determining, and changing responsive to the signaling.

A method of wireless communication is described. The method may include identifying a first time interval for performing one or more signal characteristic measurements, identifying a second time interval for performing the one or more signal characteristic measurements, wherein the second time interval is shorter than the first time interval, setting a mobility parameter threshold for changing from the first time interval to the second time interval, and signaling a user equipment (UE) to indicate the mobility parameter threshold for use by the UE in changing from the first time interval to the second time interval for performing the one or more signal characteristic measurements.

An apparatus for wireless communication is described. The apparatus may include means for identifying a first time interval for performing one or more signal characteristic measurements, means for identifying a second time interval for performing the one or more signal characteristic measurements, wherein the second time interval is shorter than the first time interval, means for setting a mobility parameter threshold for changing from the first time interval to the second time interval, and means for signaling a user equipment (UE) to indicate the mobility parameter threshold for use by the UE in changing from the first time interval to the second time interval for performing the one or more signal characteristic measurements.

A further apparatus for wireless communication is described. The apparatus may include a processor, memory in electronic communication with the processor, and instructions stored in the memory and operable, when executed by the processor, to cause the apparatus to identify a first time interval for performing one or more signal characteristic measurements, identify a second time interval for performing the one or more signal characteristic measurements, wherein the second time interval is shorter than the first time interval, set a mobility parameter threshold for changing from the first time interval to the second time interval, and signal a user equipment (UE) to indicate the mobility parameter threshold for use by the UE in changing from the first time interval to the second time interval for performing the one or more signal characteristic measurements.

A non-transitory computer-readable medium storing code for wireless communication is described. The code may include instructions executable to identify a first time interval for performing one or more signal characteristic measurements, identify a second time interval for performing the one or more signal characteristic measurements, wherein the second time interval is shorter than the first time interval, set a mobility parameter threshold for changing from the first time interval to the second time interval, and signal a user equipment (UE) to indicate the mobility parameter threshold for use by the UE in changing from the first time interval to the second time interval for performing the one or more signal characteristic measurements.

In some examples of the method, apparatuses, or non-transitory computer-readable medium described herein, the first time interval and second time interval correspond to different periodicities of a discontinuous reception (DRX) cycle. Additionally or alternatively, in some examples the one or more signal characteristic measurements comprise one or more reference signal receive power (RSRP) measurements.

In some examples of the method, apparatuses, or non-transitory computer-readable medium described herein, the one or more signal characteristic measurements comprise one or more measurements associated with a radio link monitoring (RLM) process. Additionally or alternatively, in some examples the RLM process comprises evaluating a link quality of a link with a serving base station to trigger a connection re-establishment following a determination that the link quality is below a certain threshold.

In some examples of the method, apparatuses, or non-transitory computer-readable medium described herein, the mobility parameter threshold is based at least in part on a reference signal received power (RSRP) threshold. Additionally or alternatively, in some examples the mobility parameter threshold is based at least in part on one or more of a speed of the UE, a variation in received signal reference power (RSRP) measurements, or a number of visited cells within a time period.

In some examples of the method, apparatuses, or non-transitory computer-readable medium described herein, the changing from the first time interval to the second time interval is performed autonomously by the UE. Additionally or alternatively, some examples may include processes, features, means, or instructions for receiving a signal from the UE that the second time interval is being used for performing the one or more signal characteristic measurements.

Some examples of the method, apparatuses, or non-transitory computer-readable medium described herein may further include processes, features, means, or instructions for receiving a signal from the UE indicating one or more of the signal characteristic measurements, and triggering a handover from a serving base station to a target base station responsive to the one or more signal characteristic measurements. Additionally or alternatively, some examples may include processes, features, means, or instructions for receiving a signal from the UE that a discontinuous reception (DRX) cycle periodicity is changed at the user equipment (UE).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
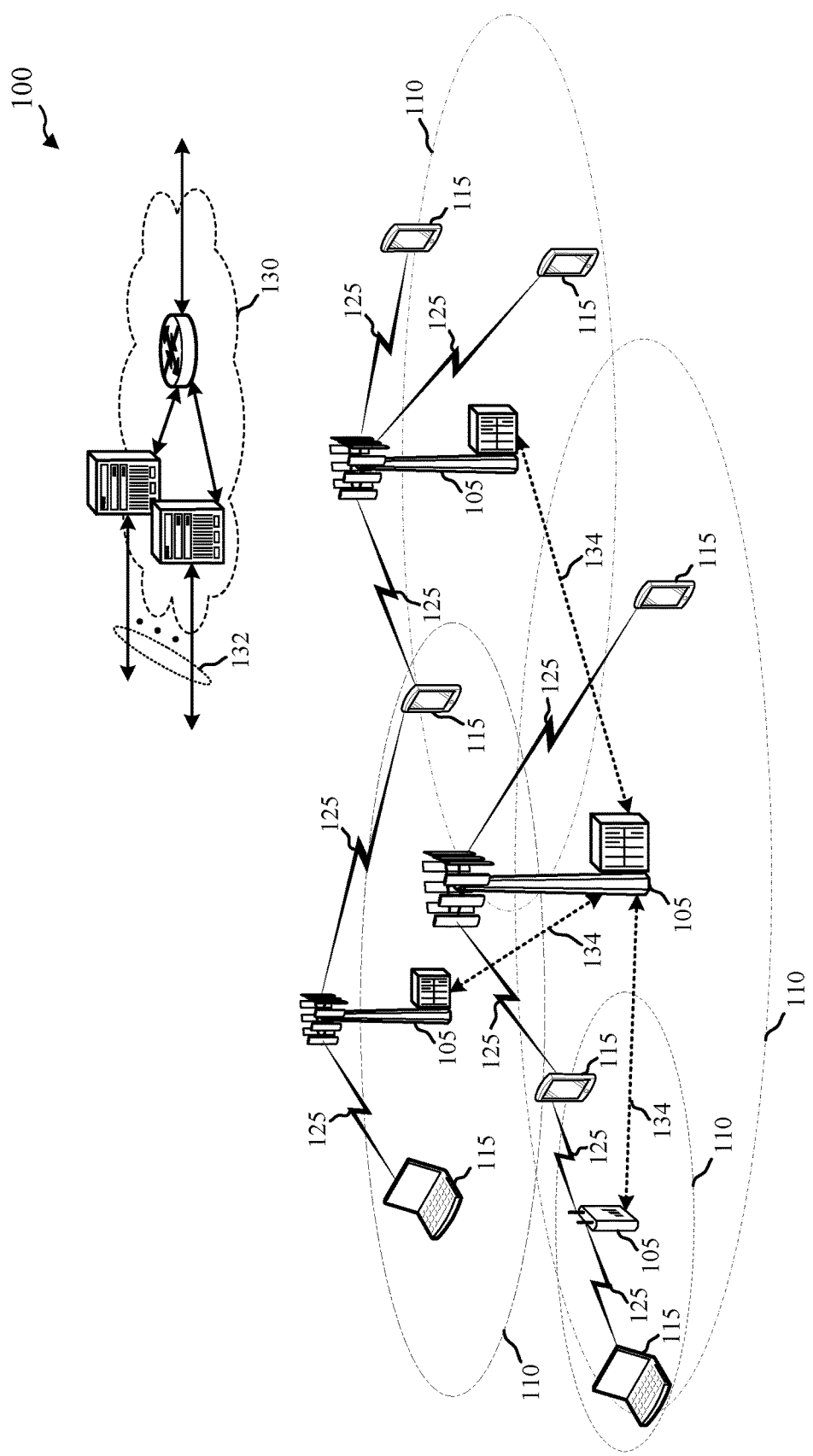
FIG. 1 illustrates an example of a wireless communication system, in accordance with various aspects of the present disclosure.

Techniques are described for adaptively changing a periodicity of measuring signal characteristics for a UE in a relatively high speed environment based on one or more signal characteristics being outside of an established threshold. In some examples periodicity of measuring signal characteristics may be made directly by changing an interval at which measurements (e.g., reference signal received power (RSRP) measurements) are taken if a measurement is less than the established threshold. In certain examples, periodicity of measuring signal characteristics may be made indirectly by changing the length of a discontinuous reception (DRX) cycle. Additionally or alternatively, one or more radio link monitoring (RLM) parameters may be modified based on a determination that a UE is in a high speed environment or measured signal characteristics are outside of the threshold.

Such techniques may be enabled in the event that a user equipment (UE) is in a high speed environment (e.g., high speed trains moving at about 215 mph (350 km/h)). High speed environments may present difficulties for certain UEs and wireless communications networks to maintain a connection when passing out of a coverage area of one base station and into the coverage area of another base station. In order to maintain a connection, a hand over (HO) between base stations may be performed. In order to ensure that HO (or cell re-selection if a UE is in idle mode) between base stations is timely performed, the UE may perform measurements to find new suitable cells. In high speed environments, such measurements may need to be performed relatively frequently.

In some deployments, a UE may enter a DRX mode in which the UE may be idle for a certain period of time, and wake up to monitor signals transmitted by a base station. The period of time for DRX mode may be referred to as the DRX cycle, and a periodicity of such a cycle may be set by a wireless communications network. When operating in DRX mode, the measurement delay (e.g., how fast a UE has to find a cell and measure its signal strength) scales with the DRX cycle length. More specifically, the longer the DRX cycle, the longer the measurement delay. If the configured DRX cycle is relatively long, and the UE is operating in a high speed environment, the UE may not find a suitable cell in sufficient time to perform a HO, and may drop a connection with the wireless network.

In some deployments, the UE may be configured with a relatively short DRX cycle with short measurement delays. Such relatively short DRX cycles may, however, have a negative impact on UE power consumption due to the increased periodicity at which the UE would search for neighbor cells. According to some aspects of the present disclosure, a UE may adaptively change intervals at which measurements are performed. For example, if a UE is in a high speed environment, less frequent signal characteristic measurements may be performed if one or more characteristics (e.g., RSRP) exceed a threshold, and more frequent measurements may be performed if the one or more characteristics are less than the threshold. In such a manner, a hand over (HO) may be initiated in sufficient time to reduce the likelihood that a connection is dropped. In some examples, the measurement threshold may be set as a last RSRP measurement of a UE prior to HO from a prior base station. In such examples, it may be assumed that the characteristics for HO from consecutive base stations in a high speed environment will be relatively uniform, and the measurement threshold may be adjusted based at least in part on the measurements from one or more prior HOs.

Aspects of the disclosure are initially described in the context of a wireless communication system. Specific examples are then described for a parameter measurement interval adjustment process. These and other aspects of the disclosure are further illustrated by and described with reference to apparatus diagrams, system diagrams, and flowcharts that relate to mobility for high speed scenarios.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

In some examples, wireless communications system 100 may serve one or more UEs 115 that operate in high speed environments. UEs 115 in such environments may, in some examples, may be configured to adaptively change DRX cycles or periodicity of measuring signal characteristics. In some examples, a base station 105 may configure a measurement parameter threshold on which a UE 115 may change a DRX interval or an interval at which it performs measurements. If a measured signal characteristic (e.g., RSRP) is above the configured measurement parameter threshold, a UE 115 may use a first interval for signal characteristic measurements or DRX cycle length. If the measured signal characteristic is below the configured measurement parameter threshold, the UE may change to a second time interval for the signal characteristic measurements or shorter DRX cycle length. In some examples, a UE may, additionally or alternatively, change a radio link monitoring (RLM) parameter based on a measured signal characteristic to trigger a connection re-establishment more quickly. In some examples, a UE 115 may signal a base station 105 of the switched DRX or measurement intervals. In certain examples, a UE may autonomously change the DRX cycle length or the interval at which it performs measurements. A UE may be signaled enable the changing of DRX cycle length or intervals at which it performs measurements in the event that the UE determines that it is in a high speed deployment. A determination of being in a high speed deployment may be based on, for example, a number of cells visited in a certain amount of time, or speed estimation from position measurements.

The base stations 105 may wirelessly communicate with the UEs 115 via at least one base station antenna. Each of the base station 105 sites may provide communication coverage for a respective geographic coverage area 110. In some examples, a base station 105 may be referred to as a base transceiver station, a radio base station, an access point, a radio transceiver, a NodeB, an eNB, a Home NodeB, a Home eNodeB, or some other suitable terminology. The geographic coverage area 110 for a base station 105 may be divided into sectors making up a portion of the coverage area (not shown). The wireless communication system 100 may include base stations 105 that cover different coverage areas (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105 (or entities including one or more base stations 105). The wireless communication system 100 may be a Heterogeneous LTE/LTE-A network in which different eNBs provide coverage for various geographical regions. For example, each eNB or base station 105 may provide communication coverage for a macro cell, a small cell, or others of cell. The term "cell" is a 3GPP term that can be used to describe a base station, a carrier or component carrier associated with a base station, or a coverage area (e.g., sector, etc.) of a carrier or base station, depending on context.

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or PDCP layer may be IP-based. A MAC layer may perform packet segmentation and reassembly to communicate over logical channels, and may also perform priority handling and multiplexing of logical channels into transport channels. The MAC layer may also use HARQ to provide retransmission at the MAC layer to improve link efficiency. In the control plane, a Radio Resource Control (RRC) protocol layer may provide establishment, configuration, and maintenance of an RRC connection between a UE 115 and the base stations 105 or core network 130 supporting radio bearers for the user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 115 may be a wireless communication device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, etc. A UE may be able to communicate with various base stations and network equipment, including macro eNBs, small cell eNBs, relay base stations, and the like. A UE may also be able to communicate using different radio access technologies (RATs), such as a cellular RAT (e.g., an LTE/LTE-A RAT), a Wi-Fi RAT, or other RATs.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

In some cases, as discussed briefly above, a UE 115 may monitor a wireless link 125 continuously for an indication that the UE 115 may receive data. In other cases (e.g., to conserve power and extend battery life) a UE 115 may be configured with a DRX cycle, that may include an "On Duration" when the UE 115 may monitor for control information (e.g., on physical downlink control channel (PDCCH)) and a "DRX period" when the UE115 may power down radio components. In some cases, a UE 115 may be configured with a short DRX cycle and a long DRX cycle, and may adaptively switch between cycles based on one or more measured parameters at the UE 115. In some cases, the transition between the short DRX cycle and the long DRX cycle may be autonomously controlled by the UE 115 or by messaging from a base station 105. A UE 115 may receive scheduling messages on PDCCH during the On Duration, and when configured with a short DRX duration a UE 115 may have additional opportunities to receive a HO command.

In some cases, HO may be performed in which a UE 115 may be transferred from a serving base station 105 (known as the source base station) to another base station 105 (known as the target base station). For example, the UE 115 may be moving into the coverage area of the target base station 105, or the target base station 105 may be capable of providing better service for the UE 115 or relieving the source base station 105 of excess load. Prior to a HO, the source base station 105 may configure the UE 115 with procedures for measuring the signal quality of neighboring base stations 105. The UE 115 may then respond with a measurement report. The source base station 105 may use the measurement report to make the handover decision. The decision may also be based on radio resource management (RRM) factors such as network load and interference mitigation. When the HO decision is made, the source base station 105 may send a HO request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a HO request acknowledge message to the source base station 105, which may include RRC information to be passed on to the UE 115. The source base station 105 may then direct the UE 115 to perform the HO, and pass a status transfer message to the target base station with packet data convergence protocol (PDCP) bearer status information. The UE 115 may attach to the target base station via a RACH procedure.

A base station 105 may provide a UE 115 with a measurement reporting configuration as part of an RRC configuration. The measurement reporting configuration may include parameters related to which neighbor cells and frequencies the UE 115 should measure, criteria for sending measurement reports, intervals for transmission of measurement reports (i.e., measurement gaps), and other related information. In some cases, measurement reports may be triggered by events related to the channel conditions of the serving cells or the neighbor cells, as discussed herein.

Figure 2:
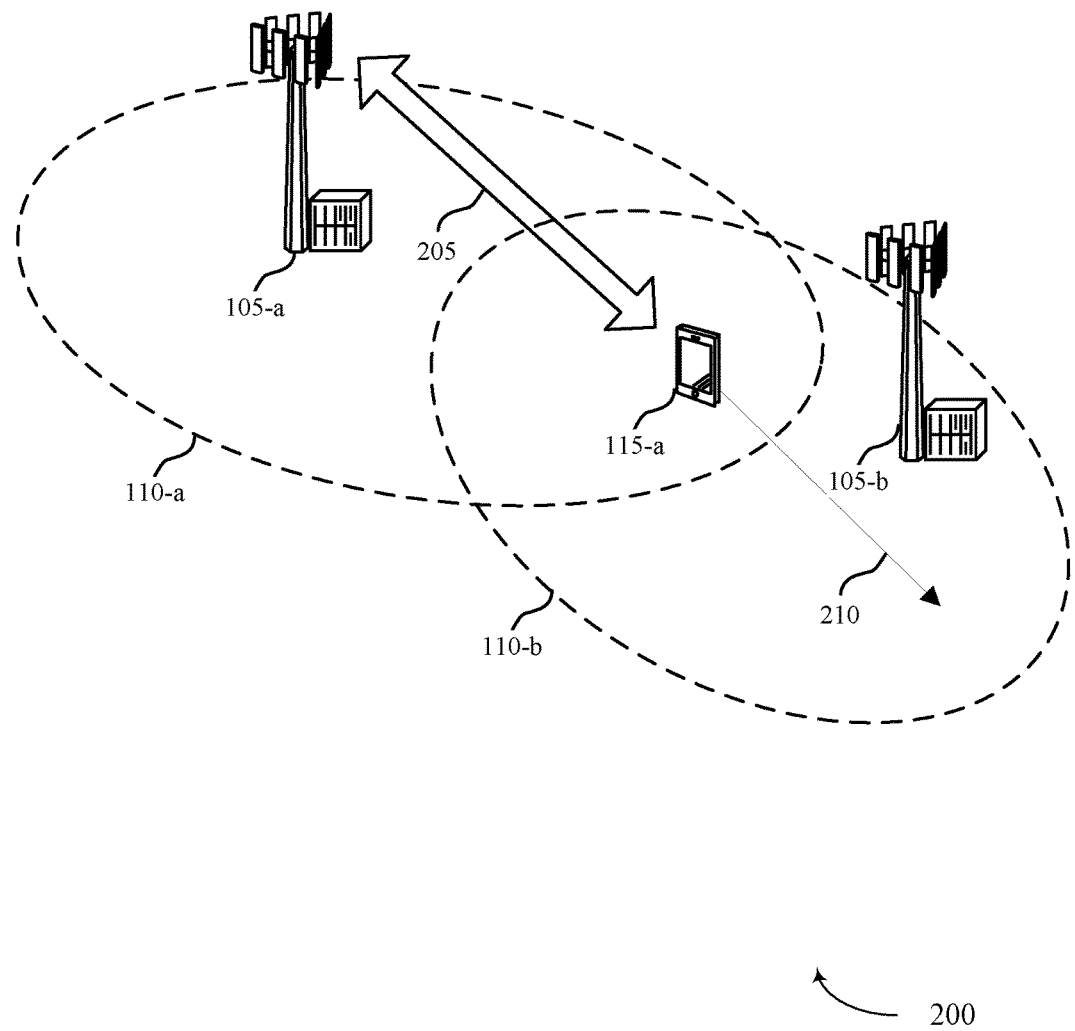
FIG. 2 illustrates an example of a wireless communication system, in accordance with various aspects of the present disclosure.

FIG. 2 illustrates an example of a wireless communication system 200, in accordance with various aspects of the present disclosure. The wireless communication system 200 may include base stations 105-a and 105-b and a UE 115-a, which may be examples of aspects of the base stations 105 or UEs 115 described with reference to FIG. 1. In this example, base station 105-a may have a coverage area 110-a and may have a connection 205 with UE 115-a. The UE 115-a may be traveling in direction 210 into coverage area 110-b of base station 105-b. In some examples, the UE 115-a may be traveling at a relatively high rate of speed, and may adaptively change an interval for measuring signal characteristics of base station 105-a or base station 105-b based on one or more measured signal characteristics being below a set threshold value.

Figure 3:
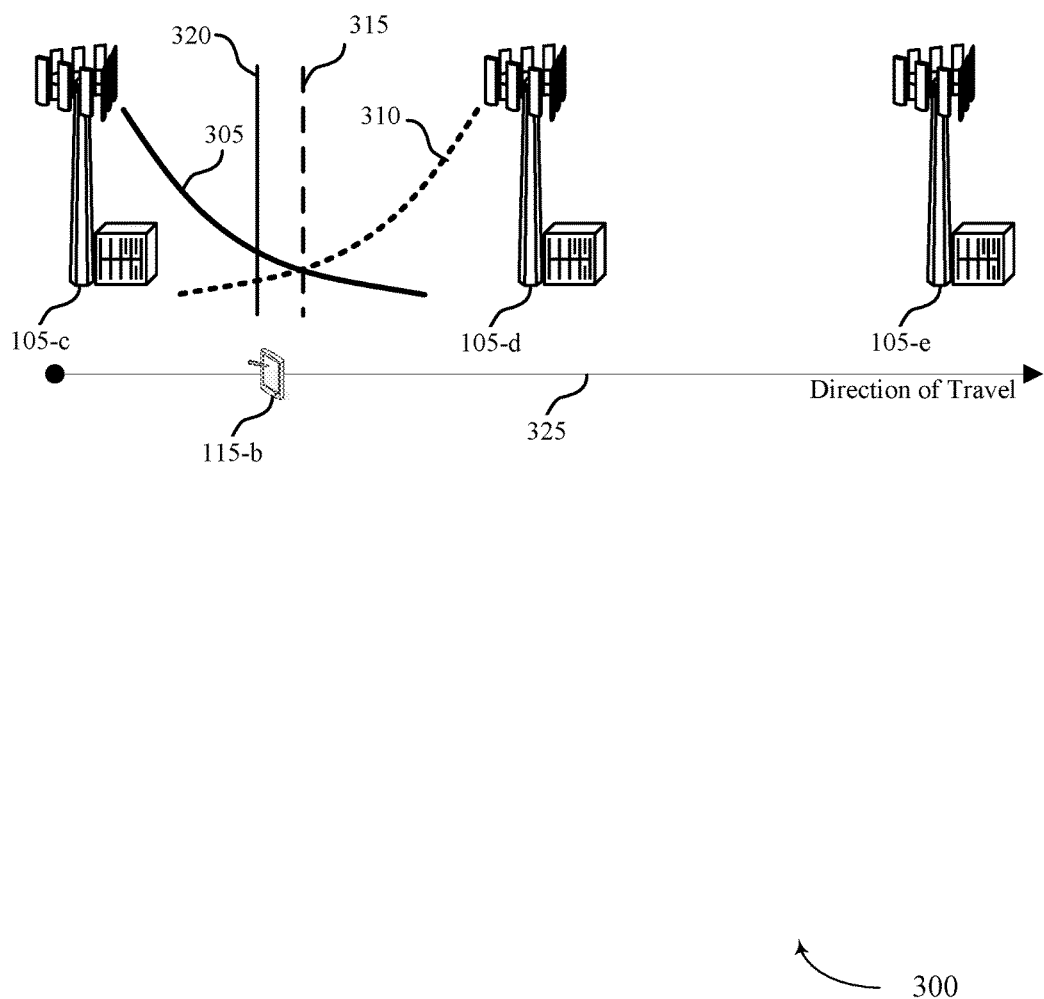
FIG. 3 illustrates an example of a wireless communication system with high-speed deployment, in accordance with various aspects of the present disclosure.

FIG. 3 illustrates an example of a wireless communication system 300 and received signal powers associated with different base stations, in accordance with various aspects of the present disclosure. The wireless communication system 300 may include base stations 105-c, 105-d, and 105-e and a UE 115-b, which may be examples of aspects of the base stations 105 or UEs 115 described with reference to FIG. 1 or 2. As mentioned above, in some examples UE 115-b may be traveling at a relatively high rate of speed, such as speeds exceeding 200 mph (or 350 km/h) on a high speed train. Of course, techniques disclosed herein may also be applied in other scenarios that may not be high speed environments, and that may be relatively sensitive to dropped connections. In the example, of FIG. 3, the UE 115-b may be moving in direction 325, and moving out of a coverage area of base station 105-c and into coverage area of base station 105-d. A RSRP value for base station 105-b is illustrated as signal power 305, and a RSRP value for base station 105-c is illustrated as signal power 310. The HO between base station 105-c and base station 105-d should ideally occur at about location 315. As discussed above, if UE 115-b is configured with a signal measurement time interval that is relatively long, a HO may not be initiated until after location 315, which may increase the likelihood of a dropped connection. As also mentioned above, UE 115-b may be configured with a relatively short measurement time interval, which may adversely affect power consumption of the UE 115-b.

According to various examples, UE 115-b may adaptively change from a first measurement interval to a second, more frequent, measurement interval at point 320. In such aspects, UE 115-b may have reduced power consumption and still perform relatively frequent measurements in the event that a HO is likely to be performed relatively soon. Furthermore, in some examples, such changing of measurement time intervals may be enabled in the event that it is determined that the UE 115-b is moving at a relatively high rate of speed. Thus, if the UE 115-b is moving relatively slowly, measurements may continue to be made according to the first interval. As the UE 115-b continues along direction of travel 325 between base station 105-d and base station 105-e, the process may be repeated.

In some examples, a serving cell signal strength (e.g., RSRP) threshold may be identified, based on which the UE 115-b may change the way it performs measurements. In some examples, the change in the measurement interval may be achieved indirectly through an adjustment of the length of the DRX cycle of UE 115-b. In further examples, one or more RLM parameters may be adjusted. If a measured signal strength (e.g., RSRP) is above the threshold, the UE 115-b can use the first interval or configured DRX cycle. If the signal strength (e.g., RSRP) goes below the threshold the UE 115-b starts to perform measurement more frequently or may switch to a shorter DRX cycle, which would increase the measurement frequency and also provide more opportunities to communicate with the network (e.g., receive a HO command). The UE 115-b, as mentioned above, may also change one or more RLM parameters (e.g., to shorten the serving cell evaluation period) based on such signaling to speed up connection re-establishment.

The parameter threshold may be established based on the particular deployment of wireless network 300. For example, it may be known that a high speed rail line is associated with base stations 105-c, 105-d, and 105-e, and it may also be determined that switching time intervals for measurements at a particular threshold may enhance likelihood of HO without a dropped connection. Thus, in some examples, the threshold may be configured for particular deployment conditions. In some examples, UE 115-b may be configured to switch DRX cycles, and may inform serving base station 105-c that is has switched DRX cycles, which may allow base station 105-c to transmit downlink signals according to the new DRX cycle. In some examples, UE 115-b may autonomously trigger more frequent measurements or change RLM parameters based on some RSRP thresholds or differences seen between consecutive measurements (e.g., if the difference is very high it may be determined that the UE 115-b is moving relatively fast, so it triggers more frequent measurements). Base station 105-c may also signal to the UE 115-b that it is in a high speed deployment or the UE 115-b could determine high speed through other techniques (e.g., a number of cells visited in a certain amount of time, or speed estimation from position measurements, etc.).

Figure 4:
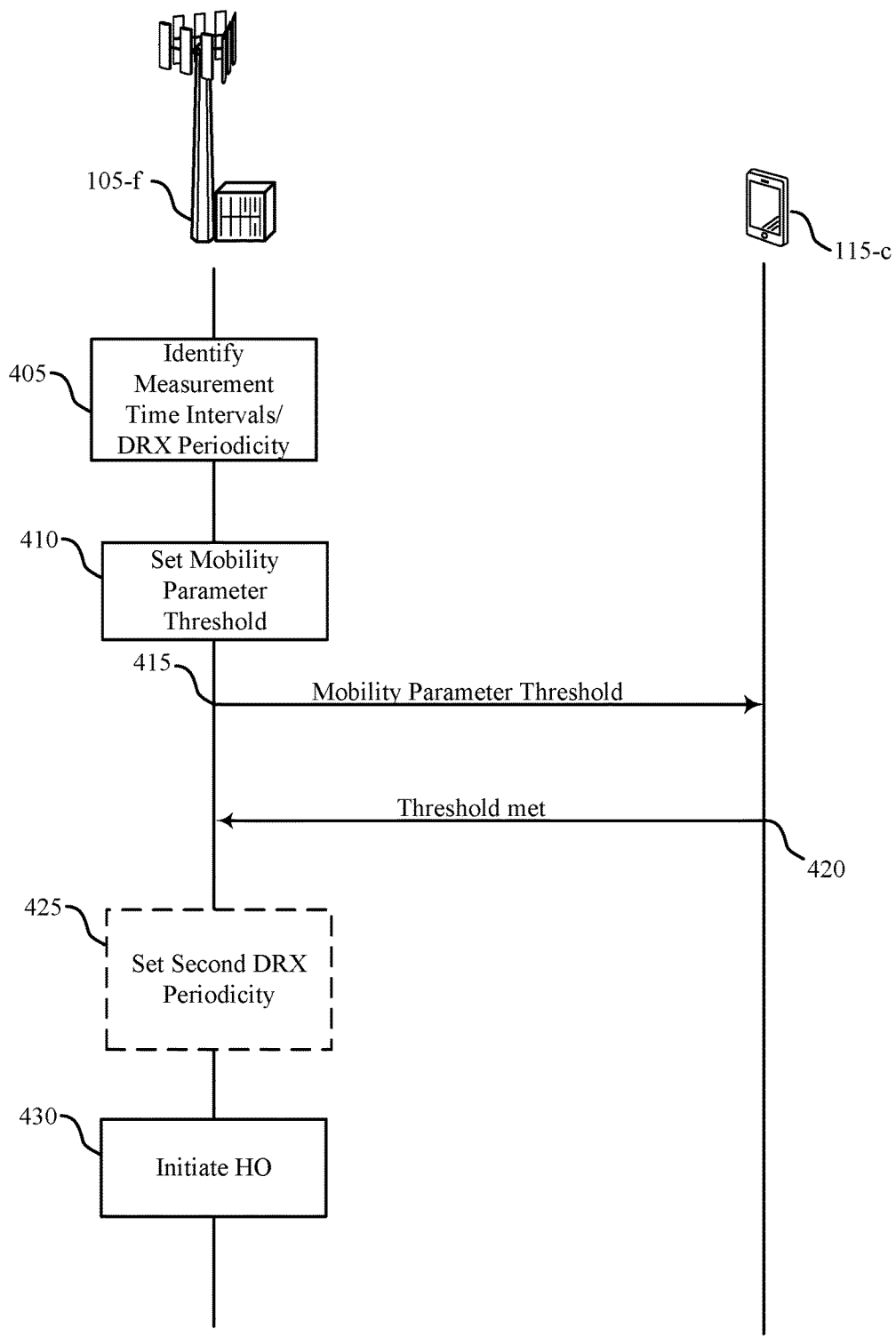
FIGS. 4-5 illustrate examples of a process flows that support techniques for contention window adjustment for transmissions in a shared radio frequency spectrum band, in accordance with various aspects of the present disclosure.

FIG. 4 illustrates an example of a process flow 400 for mobility enhancements for high speed deployments in accordance with various aspects of the present disclosure. Process flow 400 may include a UE 115-c and base station 105-f, which may be examples of a UE 115 and base station 105 described with reference to FIGS. 1-3.

The base station 105-f may identify measurement time intervals or DRX periodicity, as indicated at block 405. At block 410, the base station 105-f may set a mobility parameter threshold. As discussed above, the mobility parameter threshold may be set to provide more frequent measurements after the threshold is reached in order to enhance the likelihood of a successful HO. In some examples, the mobility parameter threshold may be an RSRP value. The base station 105-f may signal mobility parameter threshold 415 to UE 115-c. In the event that the UE 115-c determined the mobility parameter threshold is met, the UE 115-c may transmit a threshold met signal 420. In examples where a DRX periodicity is changed upon meeting the threshold, the base station 105-f may set a second DRX periodicity. Based on measurements made at the second time intervals, base station 105-f may initiate a HO procedure, as indicated at block 430.

Figure 5:
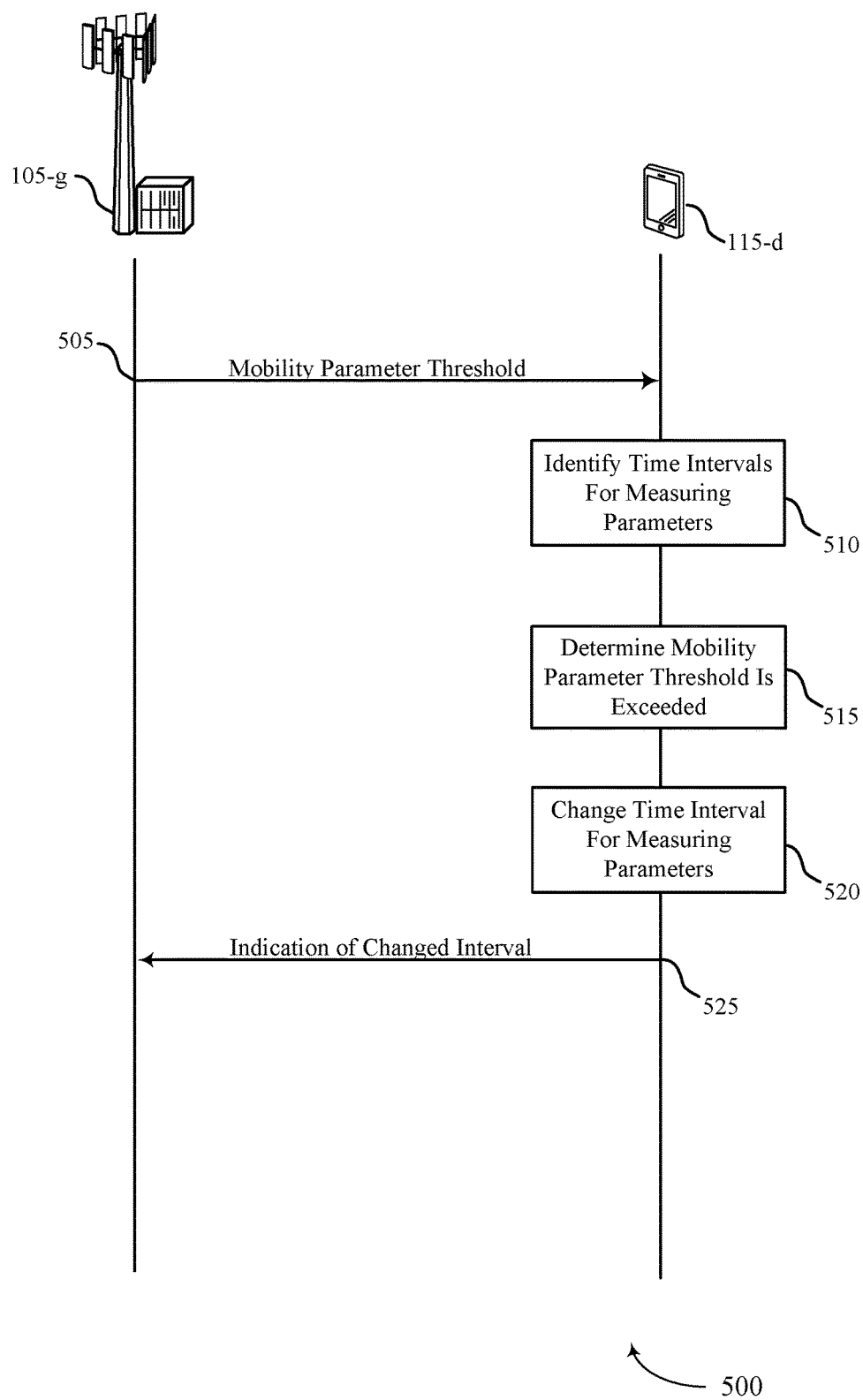

FIG. 5 illustrates an example of a process flow 500 for mobility enhancements for high speed deployments in accordance with various aspects of the present disclosure. Process flow 500 may include a UE 115-d and base station 105-g, which may be examples of a UE 115 and base station 105 described with reference to FIGS. 1-4.

The base station 105-g may signal mobility parameter threshold 505 to UE 115-d. At block 510, the UE 115-d may identify time intervals for measuring parameters. The time intervals may include first time interval and a second time interval that may be shorter than the first time interval. At block 515, the UE 115-d may determine that the mobility parameter is exceeded (e.g., a measured RSRP is less than the signaled threshold value). In some examples, the determination that the mobility parameter is exceeded may also include a determination that the UE 115-d is in a high speed environment (e.g., via signaling from base station 105-g, positioning information, numbers of cells visited in a time period, differences seen between consecutive parameter measurements, etc.). At block 520, the UE 115-d may change the time interval for measuring parameters, in order to measure parameters more frequently. The UE 115-d may signal an indication of a changed interval 525 to base station 105-g. The UE 115-d may signal one or more measured parameters to the base station 105-g, which may initiate a HO based on the measured parameters. In some examples, the UE 115-d may adjust one or more RLM parameters based on the mobility parameter threshold being exceeded.

Figure 6:
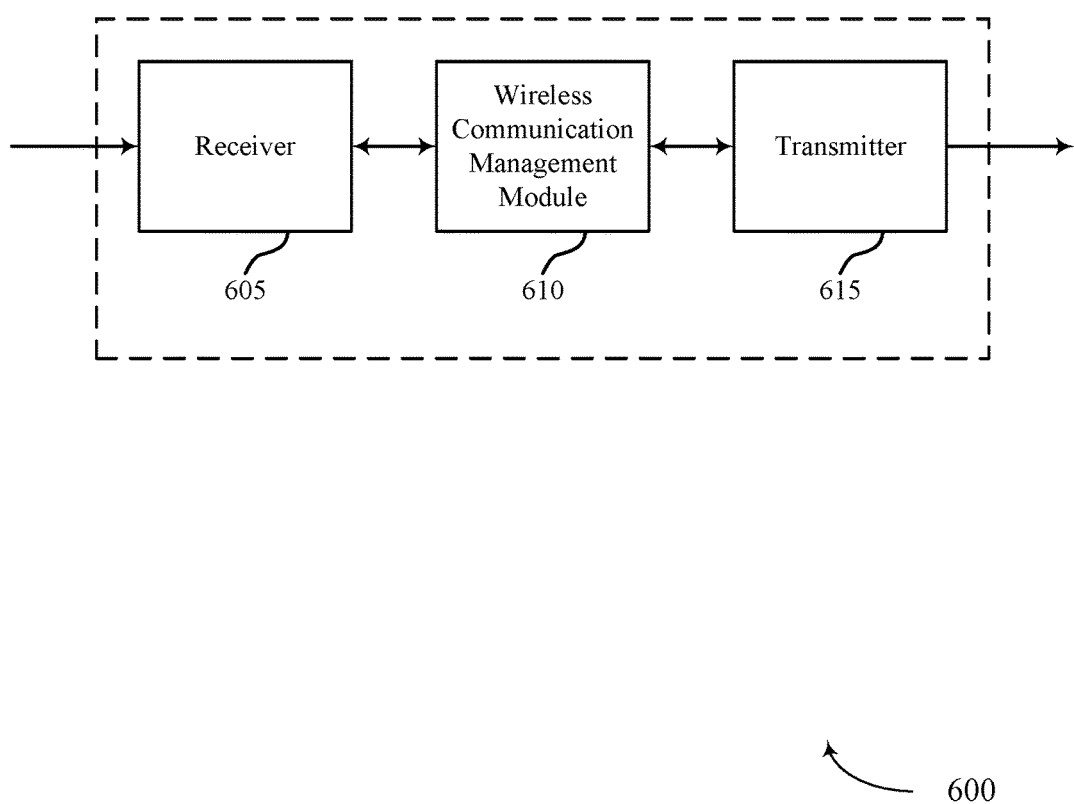
FIGS. 6-8 show block diagrams of a wireless device that supports mobility enhancements for high speed deployments in accordance with various aspects of the present disclosure.

FIG. 6 shows a block diagram of a wireless device 600 configured for mobility enhancements for high speed deployments in accordance with various aspects of the present disclosure. Wireless device 600 may be an example of aspects of a UE 115 described with reference to FIGS. 1-5. Wireless device 600 may include a receiver 605, a wireless communication management module 610, or a transmitter 615. Wireless device 600 may also include a processor. Each of these components may be in communication with each other.

The receiver 605 may receive information such as packets, user data, or control information associated with various information channels (e.g., control channels, data channels, and information related to mobility enhancements for high speed deployments, etc.). Information may be passed on to the wireless communication management module 610, and to other components of wireless device 600.

The wireless communication management module 610 may identify a first time interval for performing one or more signal characteristic measurements, determine that a mobility parameter is outside of a mobility parameter threshold, and change, responsive to the determining, to a second time interval for performing the one or more signal characteristic measurements, wherein the second time interval is shorter than the first time interval.

The transmitter 615 may transmit signals received from other components of wireless device 600. In some examples, the transmitter 615 may be collocated with the receiver 605 in a transceiver module. The transmitter 615 may include a single antenna, or it may include a plurality of antennas.

Figure 7:
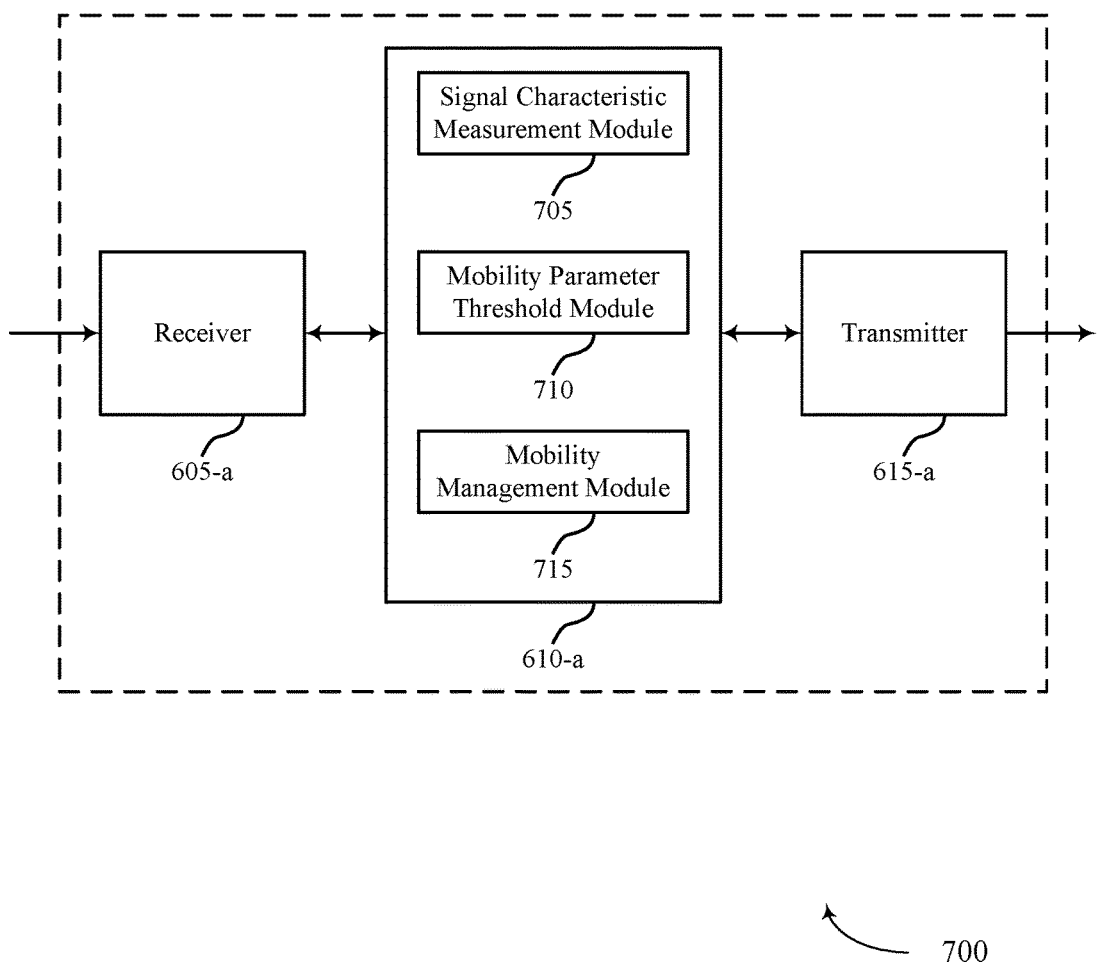

FIG. 7 shows a block diagram of a wireless device 700 for mobility enhancements for high speed deployments in accordance with various aspects of the present disclosure. Wireless device 700 may be an example of aspects of a wireless device 600 or a UE 115 described with reference to FIGS. 1-6. Wireless device 700 may include a receiver 605-*a*, a wireless communication management module 610-*a*, or a transmitter 615-*a*. Wireless device 700 may also include a processor. Each of these components may be in communication with each other. The wireless communication management module 610-*a* may also include a signal characteristic measurement module 705, a mobility parameter threshold module 710, and a mobility management module 715.

The receiver 605-*a* may receive information which may be passed on to wireless communication management module 610-*a*, and to other components of wireless device 700. The wireless communication management module 610-*a* may perform the operations described with reference to FIG. 6. The transmitter 615-*a* may transmit signals received from other components of wireless device 700.

The signal characteristic measurement module 705 may identify a first time interval for performing one or more signal characteristic measurements as described with reference to FIGS. 2-5.

The mobility parameter threshold module 710 may determine that a mobility parameter is outside of a mobility parameter threshold as described with reference to FIGS. 2-5. In some examples, the mobility parameter threshold may be based at least in part on one or more of a speed of the UE, a variation in received signal reference power (RSRP) measurements, or a number of visited cells within a time period.

The mobility management module 715 may change, responsive to the determining, to a second time interval for performing the one or more signal characteristic measurements, wherein the second time interval is shorter than the first time interval as described with reference to FIGS. 2-5. In some examples, the changing from the first time interval to the second time interval may be performed autonomously by the UE. The mobility management module 715 may also transmit a signal to a serving base station that the second time interval is being used for performing the one or more signal characteristic measurements. The mobility management module 715 may also trigger a handover from a serving base station to a target base station responsive to the one or more signal characteristic measurements. In some examples, the mobility parameter threshold, the first time interval, and the second time interval are received in signaling from a base station. The mobility management module 715 may also receive signaling from a serving base station that the UE is in a high speed deployment. In some examples, the mobility parameter threshold may be based at least in part on a reference signal received power (RSRP) threshold. In some examples, the mobility parameter threshold may be based at least in part on one or more of a speed of the UE, a variation in received signal reference power (RSRP) measurements, or a number of visited cells within a time period. In some examples, the changing from the first time interval to the second time interval may be performed autonomously by the UE. The mobility management module 715 may also trigger a handover from a serving base station to a target base station responsive to the one or more signal characteristic measurements.

Figure 8:
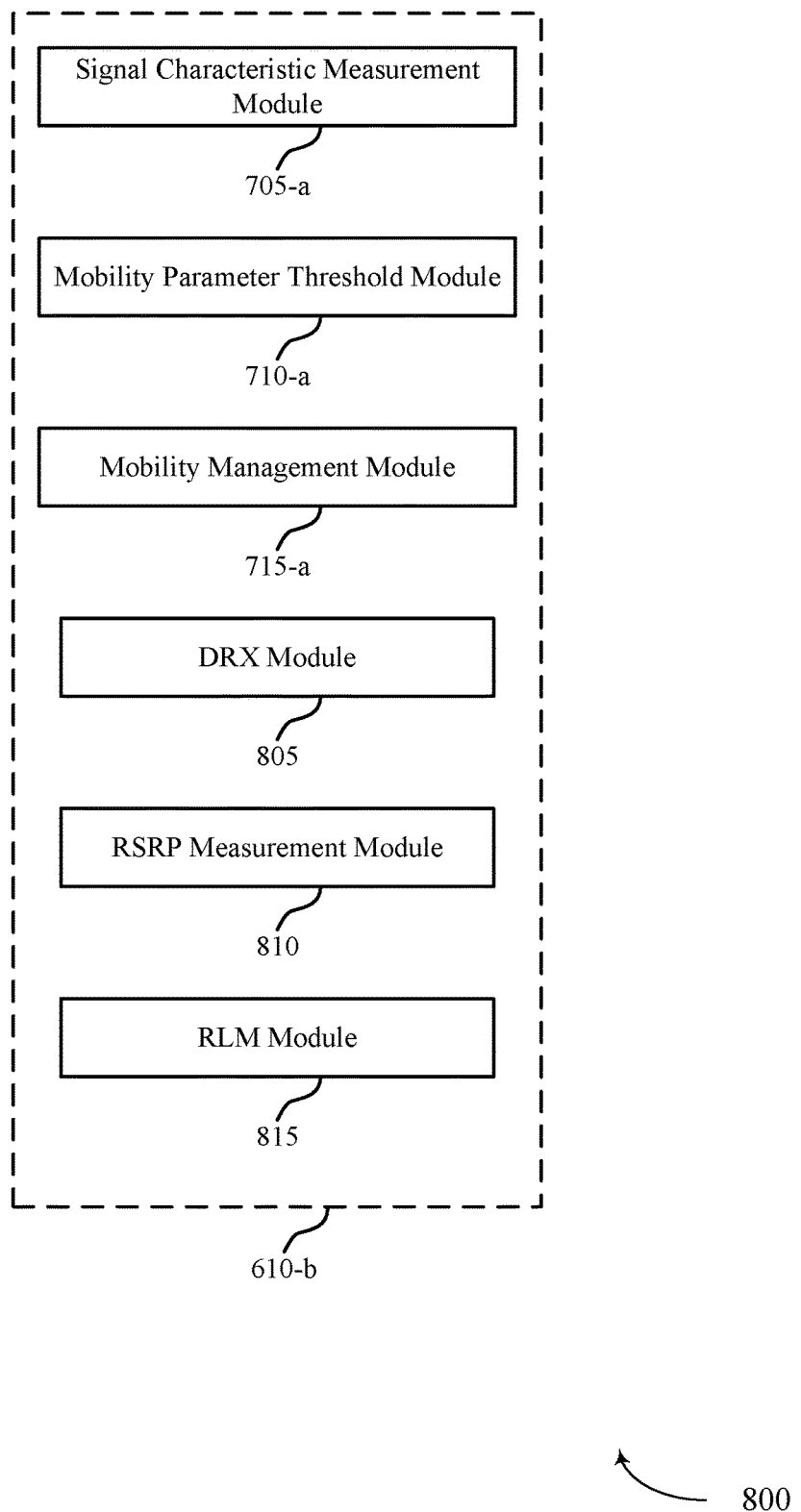

FIG. 8 shows a block diagram 800 of a wireless communication management module 610-*b* which may be a component of a wireless device 600 or a wireless device 700 for mobility enhancements for high speed deployments in accordance with various aspects of the present disclosure. The wireless communication management module 610-*b* may be an example of aspects of a wireless communication management module 610 described with reference to FIGS. 6-7. The wireless communication management module 610-*b* may include a signal characteristic measurement module 705-*a*, a mobility parameter threshold module 710-*a*, and a mobility management module 715-*a*. Each of these modules may perform the functions described with reference to FIG. 7. The wireless communication management module 610-*b* may also include a DRX module 805, a RSRP measurement module 810, and a RLM module 815.

The DRX module 805 may change a discontinuous reception (DRX) cycle from a first periodicity corresponding to the first time interval to a second periodicity corresponding to the second time interval as described with reference to FIGS. 2-5. The DRX module 805 may also transmit a signal to a serving base station that a discontinuous reception (DRX) cycle periodicity is changed at the UE. The RSRP measurement module 810 may be configured to measure reference signal receive power (RSRP) as described with reference to FIGS. 2-5. The RLM module 815 may be configured to evaluate a link quality of a link with a serving base station and trigger a connection re-establishment following a determination that the link quality may be below a RLM threshold.

Figure 9:
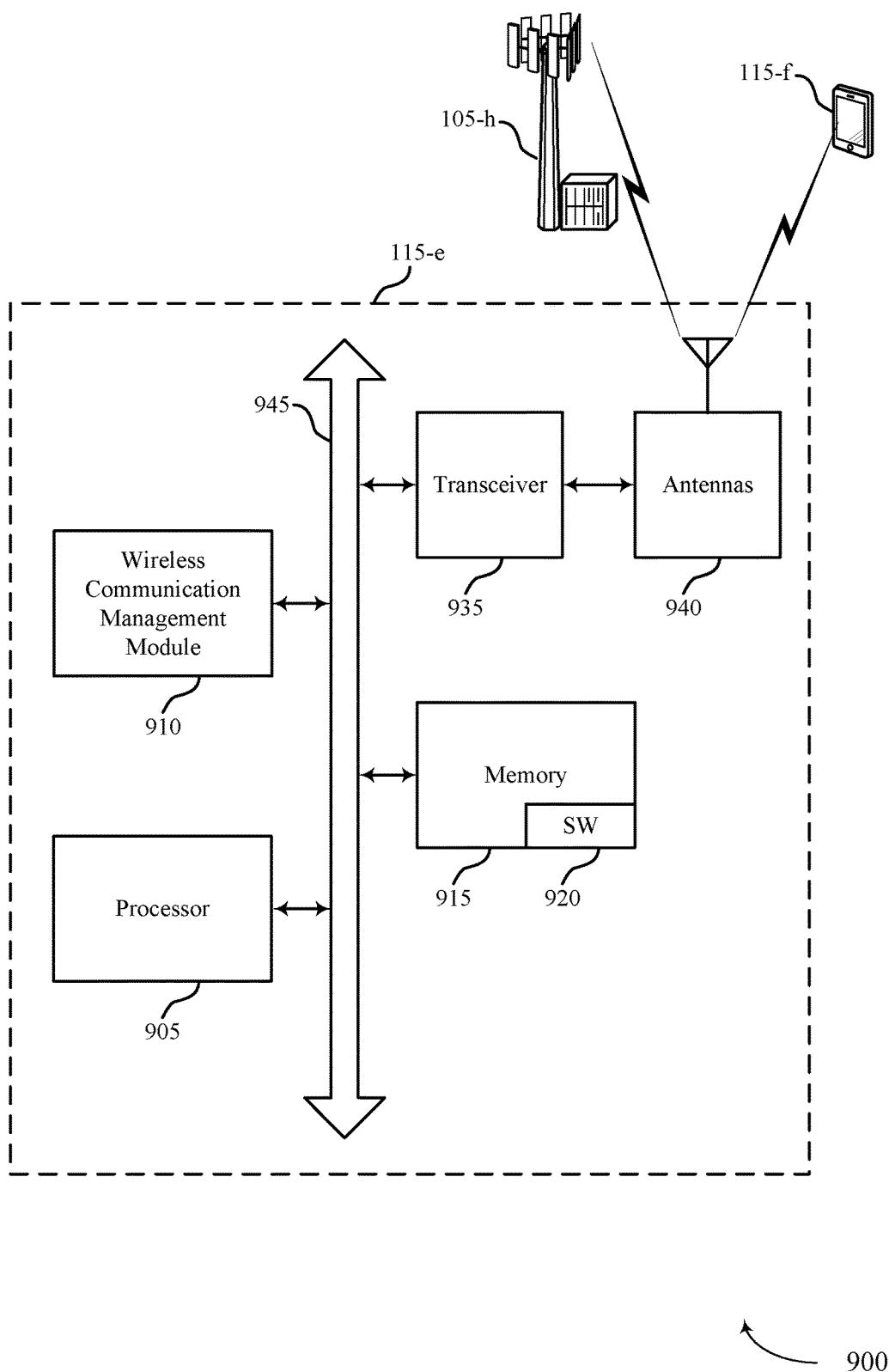
FIG. 9 illustrates a block diagram of a system including a user equipment (UE) that supports mobility enhancements for high speed deployments in accordance with various aspects of the present disclosure.

FIG. 9 shows a diagram of a system 900 including a UE 115 configured for mobility enhancements for high speed deployments in accordance with various aspects of the present disclosure. System 900 may include UE 115-*e*, which may be an example of a wireless device 600, a wireless device 700, or a UE 115 described with reference to FIGS. 1-8. UE 115-*e* may include a wireless communication management module 910, which may be an example of a wireless communication management module 610 described with reference to FIGS. 6-8. UE 115-*e* may also include components for bi-directional voice and data communications including components for transmitting communications and components for receiving communications. For example, UE 115-*e* may communicate bi-directionally with UE 115-*f* or base station 105-*h*.

UE 115-*e* may also include a processor 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*e* may include a single antenna 940, UE 115-*e* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., mobility enhancements for high speed deployments, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an application specific integrated circuit (ASIC), etc.)

Figure 10:
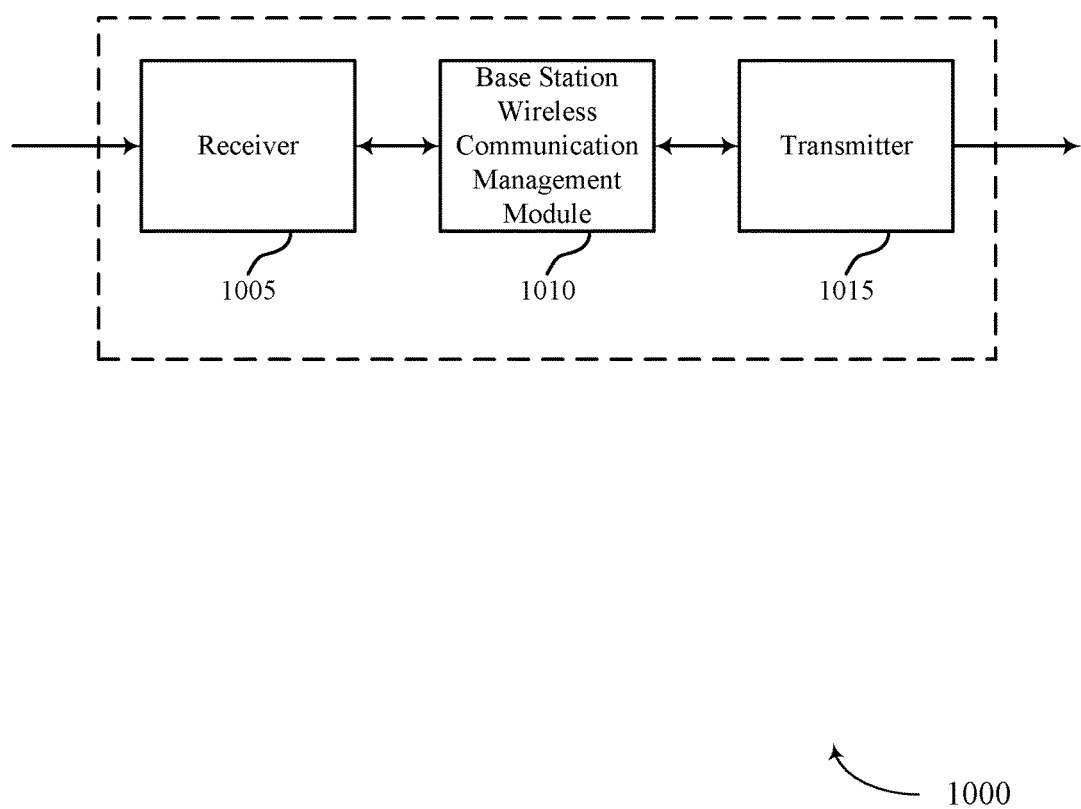
FIGS. 10-12 show block diagrams of a wireless device that supports mobility enhancements for high speed deployments in accordance with various aspects of the present disclosure.

FIG. 10 shows a block diagram of a wireless device 1000 configured for mobility enhancements for high speed deployments in accordance with various aspects of the present disclosure. Wireless device 1000 may be an example of aspects of a base station 105 described with reference to FIGS. 1-9. Wireless device 1000 may include a receiver 1005, a base station wireless communication management module 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to mobility enhancements for high speed deployments, etc.). Information may be passed on to the base station wireless communication management module 1010, and to other components of wireless device 1000.

The base station wireless communication management module 1010 may identify a first time interval for performing one or more signal characteristic measurements, identify a second time interval for performing the one or more signal characteristic measurements, wherein the second time interval is shorter than the first time interval, set a mobility parameter threshold for changing from the first time interval to the second time interval, and signal a user equipment (UE) to indicate the mobility parameter threshold for use by the UE in changing from the first time interval to the second time interval for performing the one or more signal characteristic measurements.

The transmitter 1015 may transmit signals received from other components of wireless device 1000. In some examples, the transmitter 1015 may be collocated with the receiver 1005 in a transceiver module. The transmitter 1015 may include a single antenna, or it may include a plurality of antennas.

Figure 11:
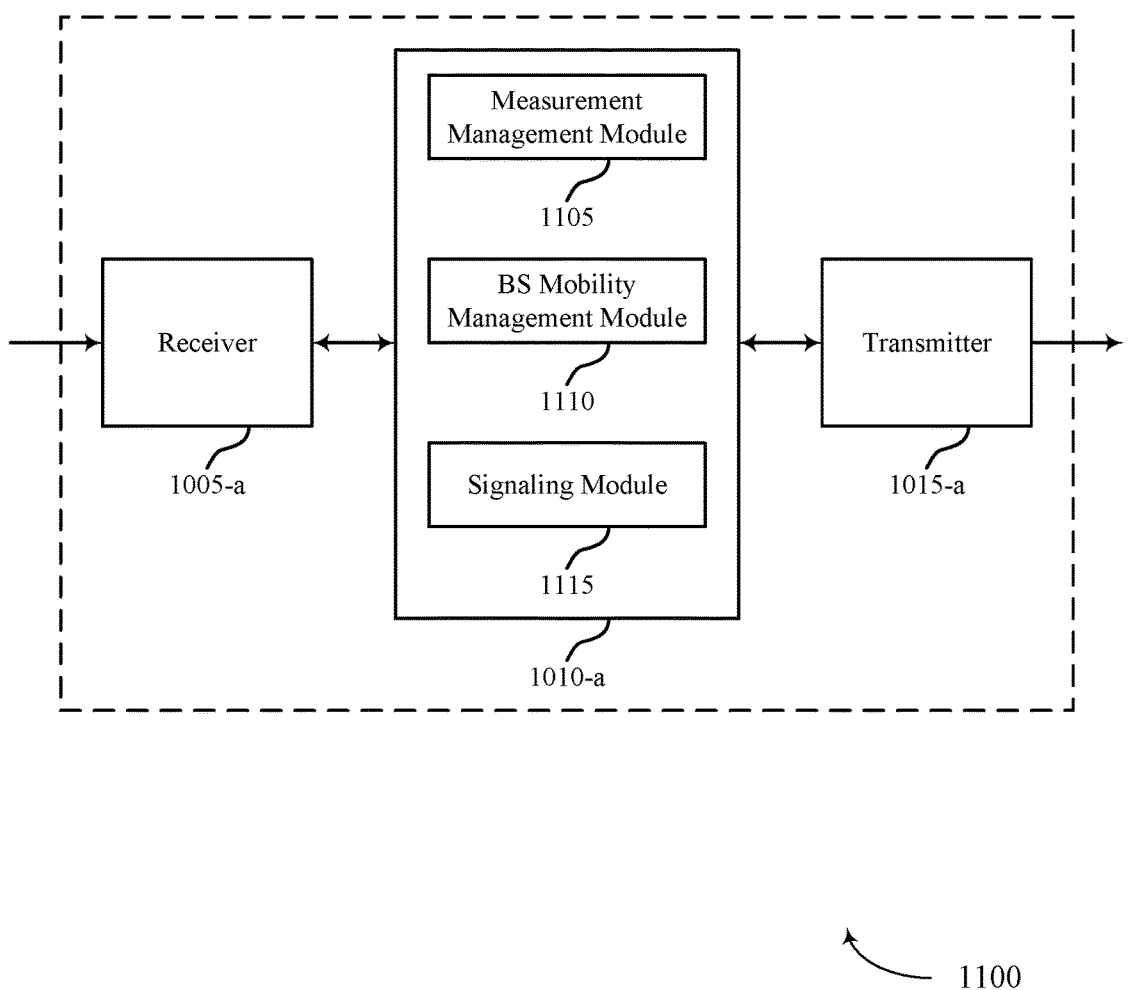

FIG. 11 shows a block diagram of a wireless device 1100 for mobility enhancements for high speed deployments in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station wireless communication management module 1010-*a*, or a transmitter 1015-*a*. Wireless device 1100 may also include a processor. Each of these components may be in communication with each other. The base station wireless communication management module 1010-*a* may also include a measurement management module 1105, a BS mobility management module 1110, and a signaling module 1115.

The receiver 1005-*a* may receive information which may be passed on to base station wireless communication management module 1010-*a*, and to other components of wireless device 1100. The base station wireless communication management module 1010-*a* may perform the operations described with reference to FIG. 10. The transmitter 1015-*a* may transmit signals received from other components of wireless device 1100.

The measurement management module 1105 may identify a first time interval for performing one or more signal characteristic measurements as described with reference to FIGS. 2-5. The measurement management module 1105 may also identify a second time interval for performing the one or more signal characteristic measurements, wherein the second time interval is shorter than the first time interval. In some examples, the one or more signal characteristic measurements comprise one or more reference signal receive power (RSRP) measurements. In some examples, the one or more signal characteristic measurements comprise one or more measurements associated with a radio link monitoring (RLM) process. In some examples, the RLM process comprises evaluating a link quality of a link with a serving base station to trigger a connection re-establishment following a determination that the link quality may be below a certain threshold. The BS mobility management module 1110 may set a mobility parameter threshold for changing from the first time interval to the second time interval as described with reference to FIGS. 2-5.

The signaling module 1115 may signal a user equipment (UE) to indicate the mobility parameter threshold for use by the UE in changing from the first time interval to the second time interval for performing the one or more signal characteristic measurements as described with reference to FIGS. 2-5. The signaling module 1115 may also receive a signal from the UE that the second time interval is being used for performing the one or more signal characteristic measurements. The signaling module 1115 may also receive a signal from the UE indicating one or more of the signal characteristic measurements. The signaling module 1115 may also receive a signal from the UE that a discontinuous reception (DRX) cycle periodicity is changed at the UE.

Figure 12:
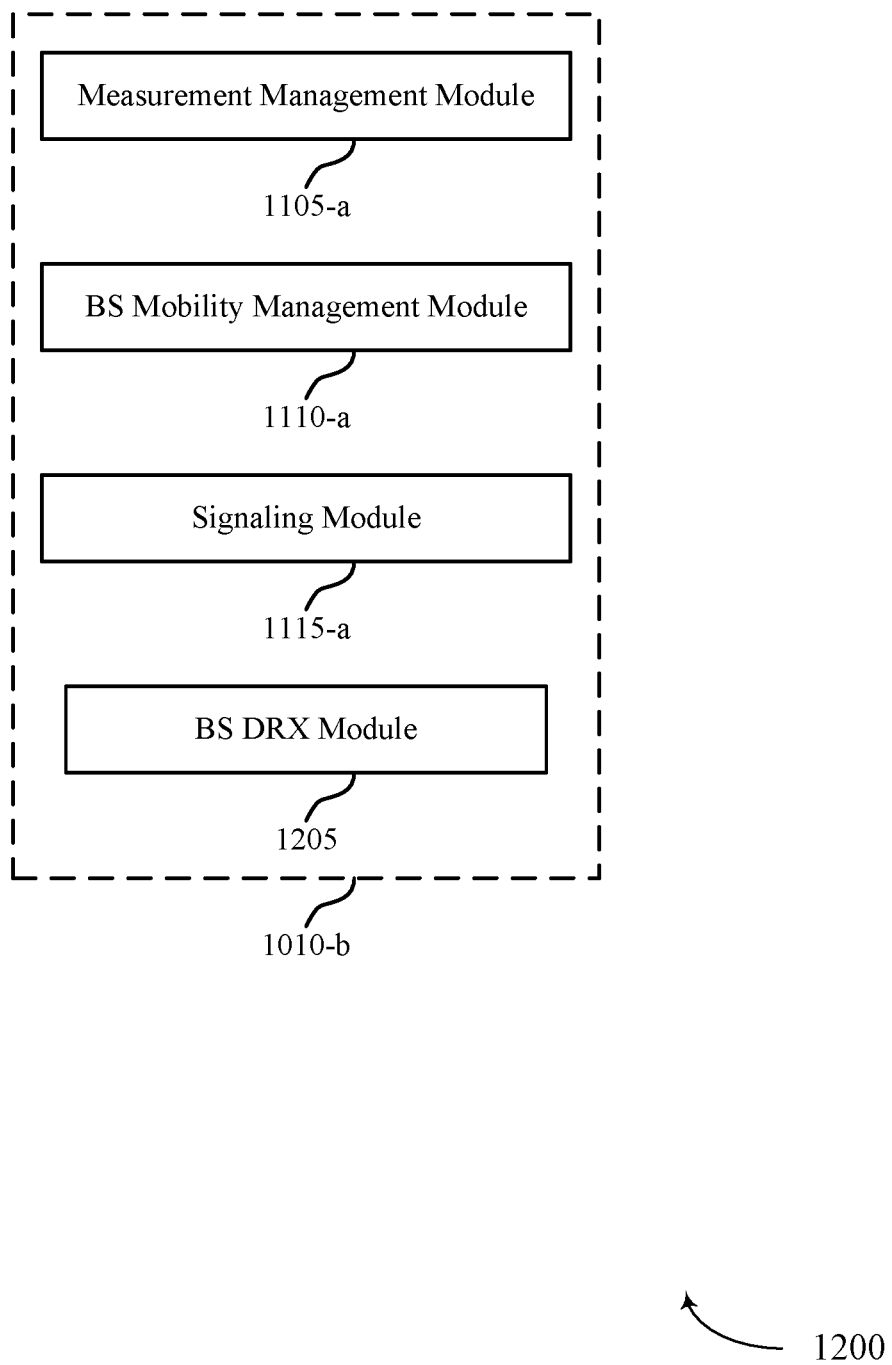

FIG. 12 shows a block diagram 1200 of a base station wireless communication management module 1010-*b* which may be a component of a wireless device 1000 or a wireless device 1100 for mobility enhancements for high speed deployments in accordance with various aspects of the present disclosure. The base station wireless communication management module 1010-*b* may be an example of aspects of a base station wireless communication management module 1010 described with reference to FIGS. 10-11. The base station wireless communication management module 1010-*b* may include a measurement management module 1105-*a*, a BS mobility management module 1110-*a*, and a signaling module 1115-*a*. Each of these modules may perform the functions described with reference to FIG. 11. The base station wireless communication management module 1010-*b* may also include and a BS DRX module 1205. The BS DRX module 1205 may be configured such that the first time interval and second time interval correspond to different periodicities of a discontinuous reception (DRX) cycle as described with reference to FIGS. 2-5.

Figure 13:
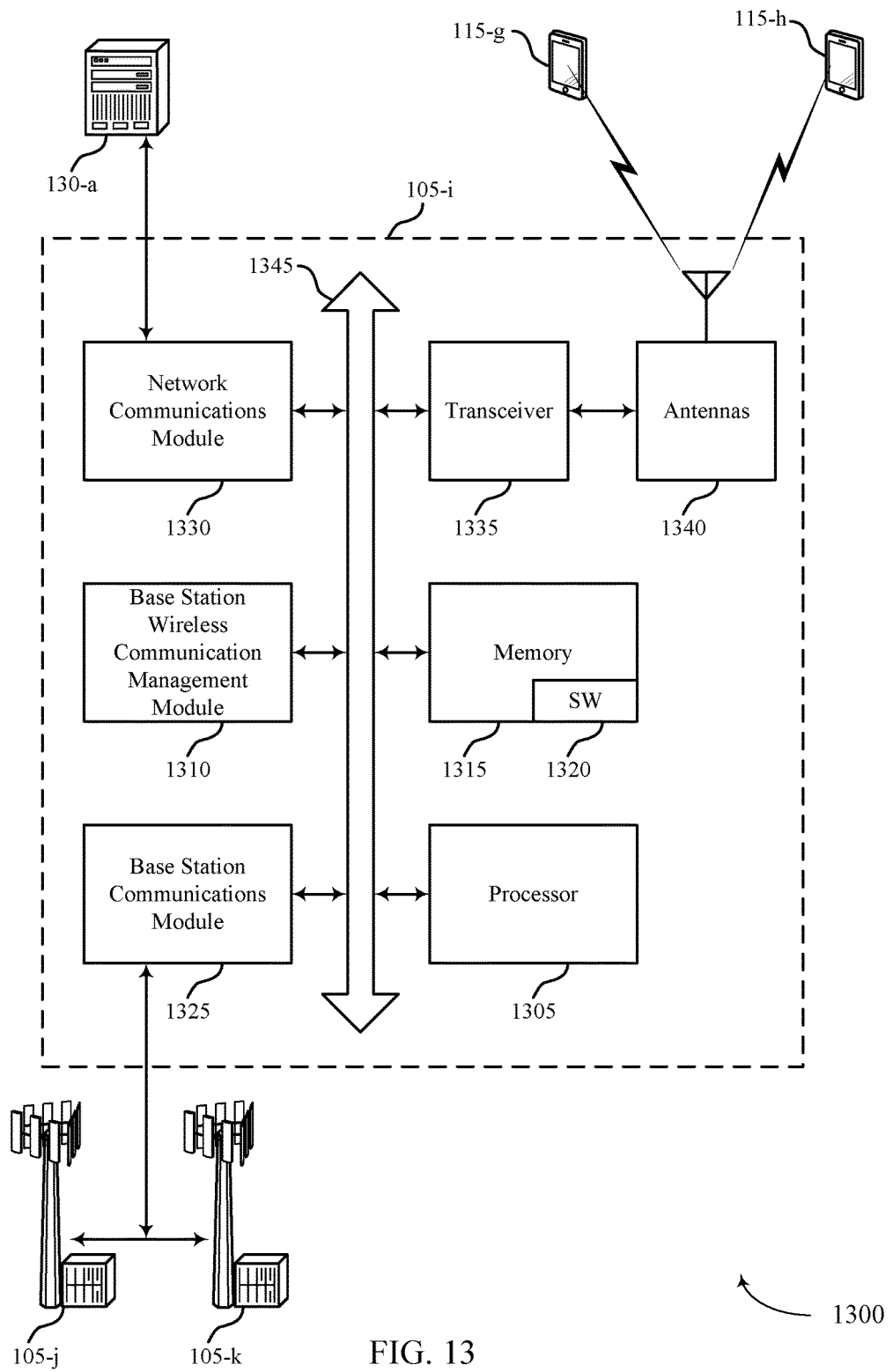
FIG. 13 illustrates a block diagram of a system including a base station that supports mobility enhancements for high speed deployments in accordance with various aspects of the present disclosure.

FIG. 13 shows a diagram of a system 1300 including a base station 105 configured for mobility enhancements for high speed deployments in accordance with various aspects of the present disclosure. System 1300 may include base station 105-*i*, which may be an example of a wireless device 1000, a wireless device 1100, or a base station 105 described with reference to FIGS. 1-12. Base Station 105-*i* may include a base station wireless communication management module 1310, which may be an example of a base station wireless communication management module 1010 described with reference to FIGS. 10-12. Base Station 105-*i* may also include components for bi-directional voice and data communications including components for transmitting communications and components for receiving communications. For example, base station 105-*i* may communicate bi-directionally with UE 115-*g* or UE 115-*h*.

In some cases, base station 105-*i* may have one or more wired backhaul links. Base station 105-*i* may have a wired backhaul link (e.g., S1 interface, etc.) to the core network 130. Base station 105-*i* may also communicate with other base stations 105, such as base station 105-*j* and base station 105-*k* via inter-base station backhaul links (e.g., an X2 interface). Each of the base stations 105 may communicate with UEs 115 using the same or different wireless communications technologies. In some cases, base station 105-*i* may communicate with other base stations such as 105-*j* or 105-$k$ utilizing base station communication module 1325. In some examples, base station communication module 1325 may provide an X2 interface within an LTE/LTE-A wireless communication network technology to provide communication between some of the base stations 105. In some examples, base station 105-$i$ may communicate with other base stations through core network 130. In some cases, base station 105-$i$ may communicate with the core network 130 through network communications module 1330.

The base station 105-$i$ may include a processor 1305, memory 1315 (including software (SW)1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-$i$) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-$i$ may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software code 1320 containing instructions that are configured to, when executed, cause the processor 1310 to perform various functions described herein (e.g., mobility enhancements for high speed deployments, call processing, database management, message routing, etc.). Alternatively, the software 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, digital signal processor (DSPs), and the like.

The base station communications module 1325 may manage communications with other base stations 105. In some cases, a communications management module may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 600, wireless device 700, and wireless communication management module 610 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
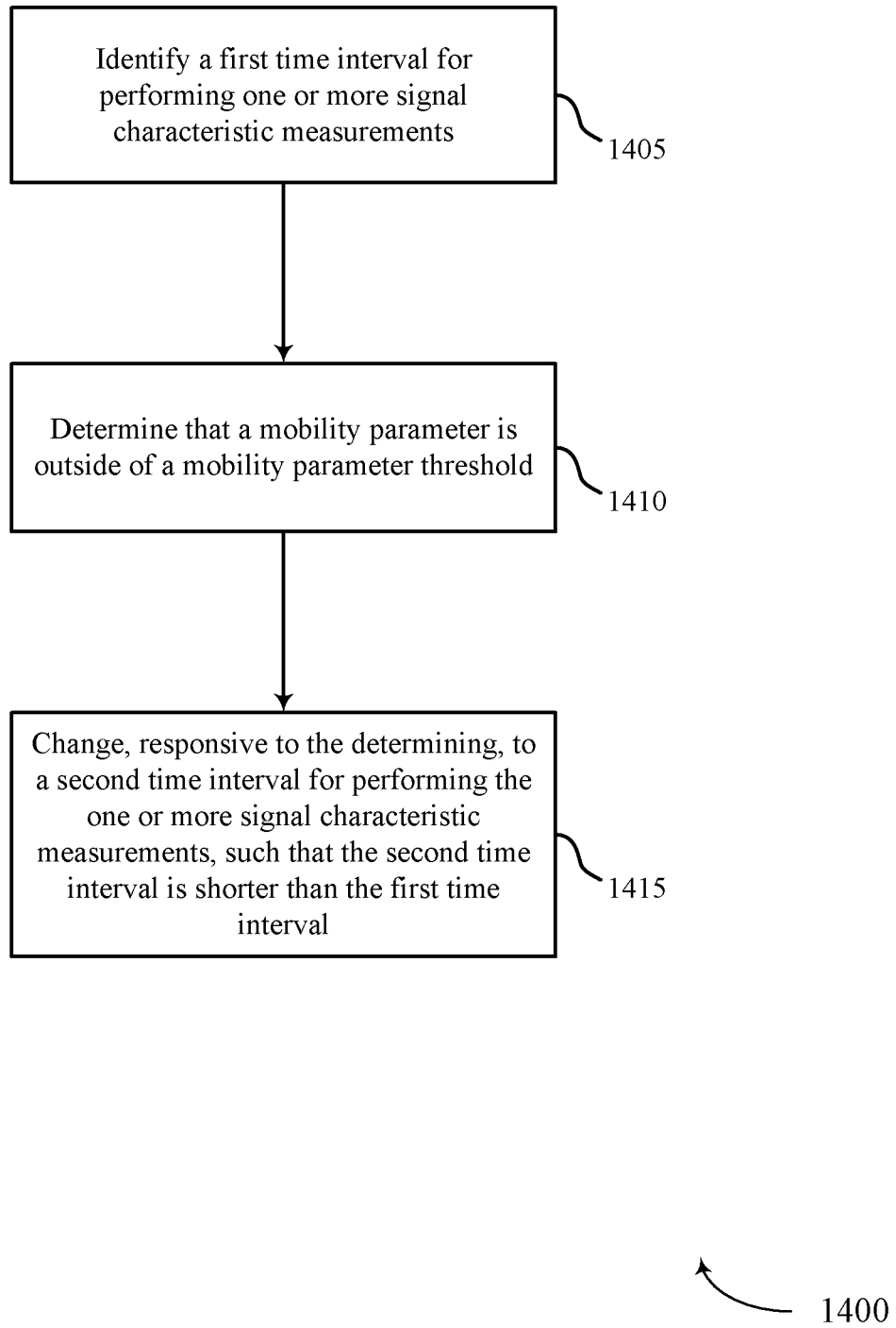
FIGS. 14-17 illustrate methods for mobility enhancements for high speed deployments in accordance with various aspects of the present disclosure.

FIG. 14 shows a flowchart illustrating a method 1400 for mobility enhancements for high speed deployments in accordance with various aspects of the present disclosure. The operations of method 1400 may be implemented by a UE 115 or its components as described with reference to FIGS. 1-13. For example, the operations of method 1400 may be performed by the wireless communication management module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may identify a first time interval for performing one or more signal characteristic measurements as described with reference to FIGS. 2-5. In certain examples, the operations of block 1405 may be performed by the signal characteristic measurement module 705 as described with reference to FIG. 7.

At block 1410, the UE 115 may determine that a mobility parameter is outside of a mobility parameter threshold as described with reference to FIGS. 2-5. In certain examples, the operations of block 1410 may be performed by the mobility parameter threshold module 710 as described with reference to FIG. 7.

At block 1415, the UE 115 may change, responsive to the determining, to a second time interval for performing the one or more signal characteristic measurements, wherein the second time interval is shorter than the first time interval as described with reference to FIGS. 2-5. In certain examples, the operations of block 1415 may be performed by the mobility management module 715 as described with reference to FIG. 7.

Figure 15:
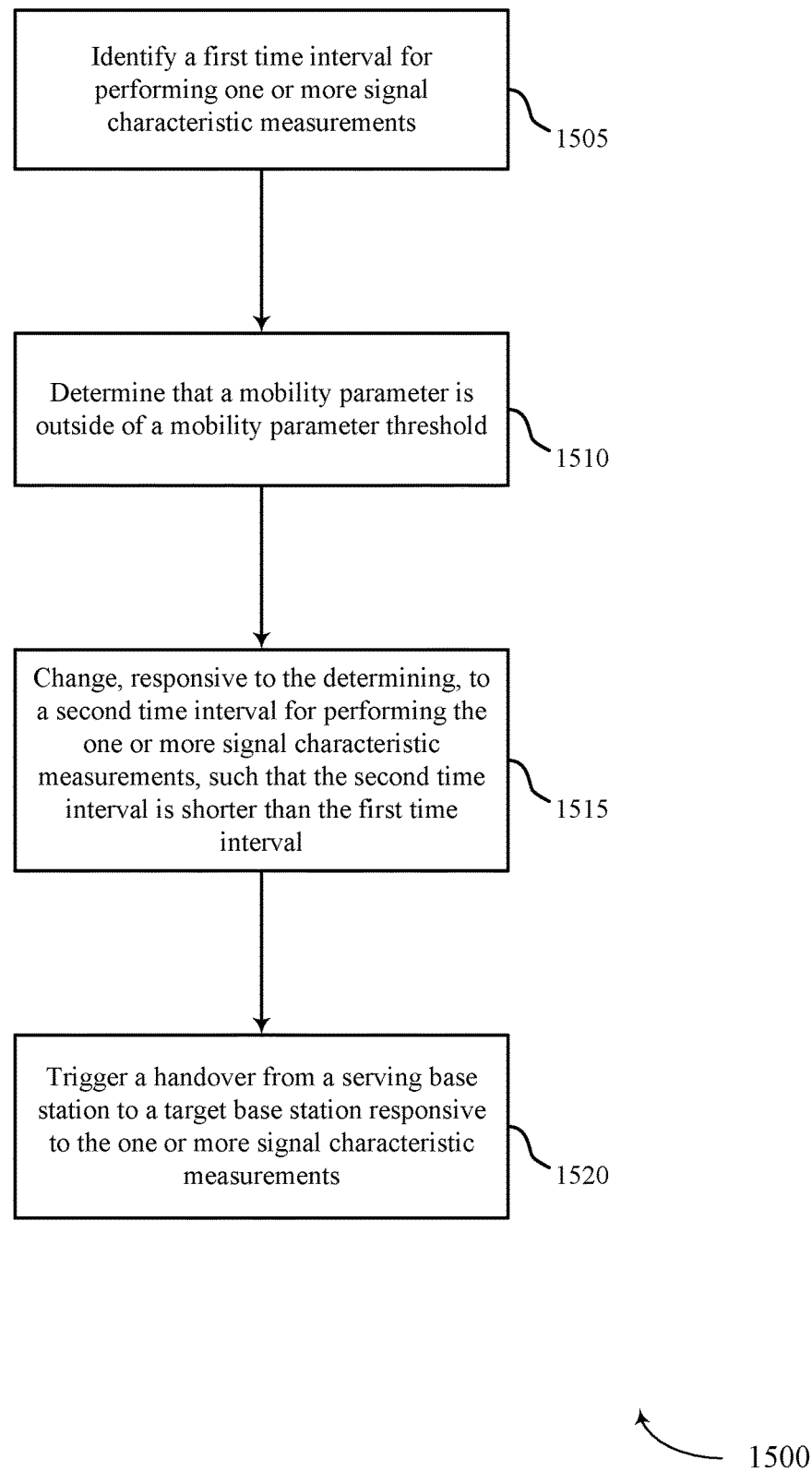

FIG. 15 shows a flowchart illustrating a method 1500 for mobility enhancements for high speed deployments in accordance with various aspects of the present disclosure. The operations of method 1500 may be implemented by a UE 115 or its components as described with reference to FIGS. 1-13. For example, the operations of method 1500 may be performed by the wireless communication management module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may identify a first time interval for performing one or more signal characteristic measurements as described with reference to FIGS. 2-5. In certain examples, the operations of block 1505 may be performed by the signal characteristic measurement module 705 as described with reference to FIG. 7.

At block 1510, the UE 115 may determine that a mobility parameter is outside of a mobility parameter threshold as described with reference to FIGS. 2-5. In certain examples, the operations of block 1510 may be performed by the mobility parameter threshold module 710 as described with reference to FIG. 7.

At block 1515, the UE 115 may change, responsive to the determining, to a second time interval for performing the one or more signal characteristic measurements, wherein the second time interval is shorter than the first time interval as described with reference to FIGS. 2-5. In certain examples, the operations of block 1515 may be performed by the mobility management module 715 as described with reference to FIG. 7.

At block 1520, the UE 115 may trigger a handover from a serving base station to a target base station responsive to the one or more signal characteristic measurements as described with reference to FIGS. 2-5. In certain examples, the operations of block 1520 may be performed by the mobility management module 715 as described with reference to FIG. 7.

Figure 16:
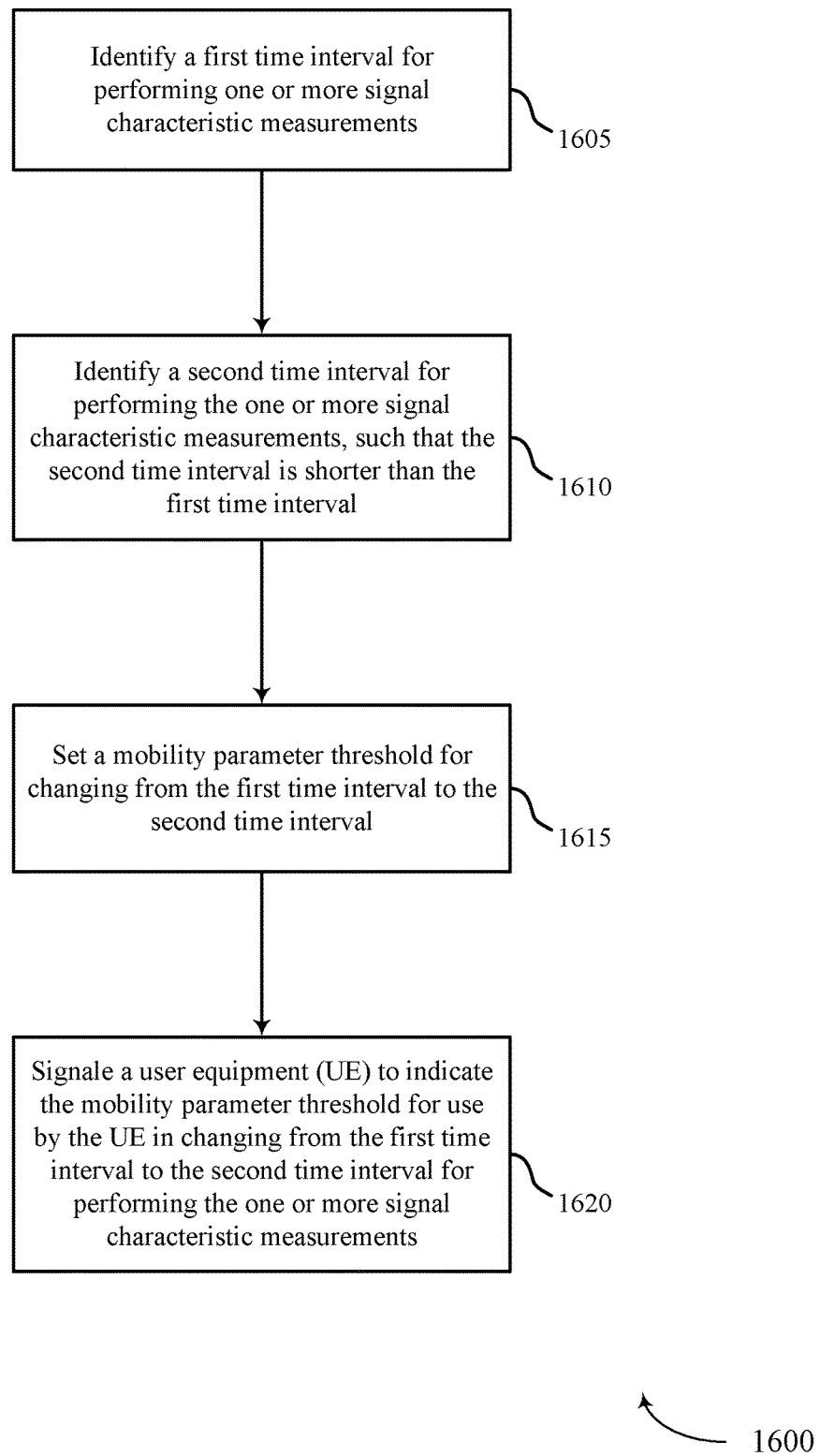

FIG. 16 shows a flowchart illustrating a method 1600 for mobility enhancements for high speed deployments in accordance with various aspects of the present disclosure. The operations of method 1600 may be implemented by a base station 105 or its components as described with reference to FIGS. 1-13. For example, the operations of method 1600 may be performed by the base station wireless communication management module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1600 may also incorporate aspects of methods 1400, and 1500 of FIGS. 14-15.

At block 1605, the base station 105 may identify a first time interval for performing one or more signal characteristic measurements as described with reference to FIGS. 2-5. In certain examples, the operations of block 1605 may be performed by the measurement management module 1105 as described with reference to FIG. 11.

At block 1610, the base station 105 may identify a second time interval for performing the one or more signal characteristic measurements, wherein the second time interval is shorter than the first time interval as described with reference to FIGS. 2-5. In certain examples, the operations of block 1610 may be performed by the measurement management module 1105 as described with reference to FIG. 11.

At block 1615, the base station 105 may set a mobility parameter threshold for changing from the first time interval to the second time interval as described with reference to FIGS. 2-5. In certain examples, the operations of block 1615 may be performed by the BS mobility management module 1110 as described with reference to FIG. 11.

At block 1620, the base station 105 may signal a user equipment (UE) to indicate the mobility parameter threshold for use by the UE in changing from the first time interval to the second time interval for performing the one or more signal characteristic measurements as described with reference to FIGS. 2-5. In certain examples, the operations of block 1620 may be performed by the signaling module 1115 as described with reference to FIG. 11.

Figure 17:
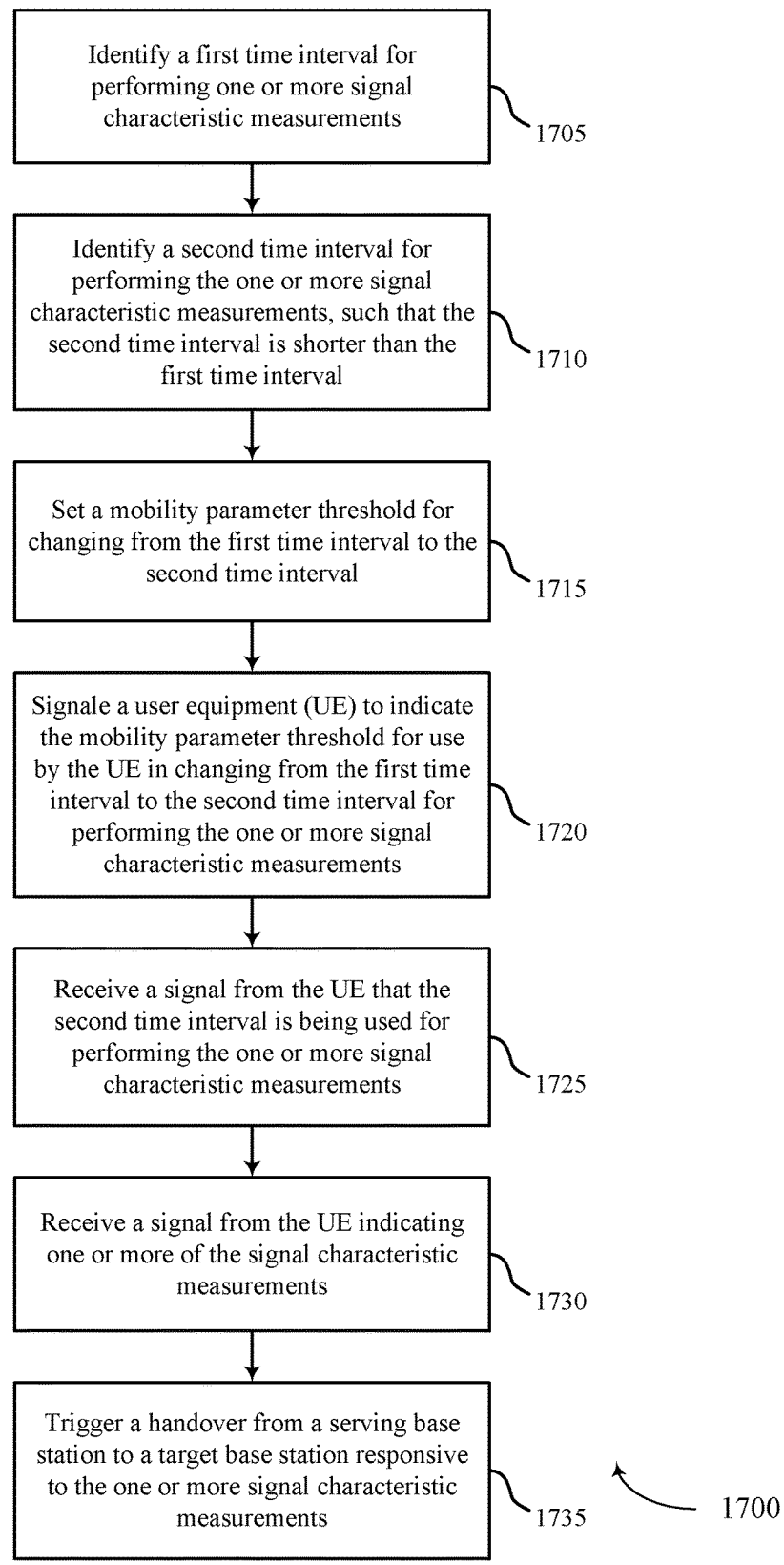

FIG. 17 shows a flowchart illustrating a method 1700 for mobility enhancements for high speed deployments in accordance with various aspects of the present disclosure. The operations of method 1700 may be implemented by a base station 105 or its components as described with reference to FIGS. 1-13. For example, the operations of method 1700 may be performed by the base station wireless communication management module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1400, 1500, and 1600 of FIGS. 14-16.

At block 1705, the base station 105 may identify a first time interval for performing one or more signal characteristic measurements as described with reference to FIGS. 2-5. In certain examples, the operations of block 1705 may be performed by the measurement management module 1105 as described with reference to FIG. 11.

At block 1710, the base station 105 may identify a second time interval for performing the one or more signal characteristic measurements, wherein the second time interval is shorter than the first time interval as described with reference to FIGS. 2-5. In certain examples, the operations of block 1710 may be performed by the measurement management module 1105 as described with reference to FIG. 11.

At block 1715, the base station 105 may set a mobility parameter threshold for changing from the first time interval to the second time interval as described with reference to FIGS. 2-5. In certain examples, the operations of block 1715 may be performed by the BS mobility management module 1110 as described with reference to FIG. 11.

At block 1720, the base station 105 may signal a user equipment (UE) to indicate the mobility parameter threshold for use by the UE in changing from the first time interval to the second time interval for performing the one or more signal characteristic measurements as described with reference to FIGS. 2-5. In certain examples, the operations of block 1720 may be performed by the signaling module 1115 as described with reference to FIG. 11.

At block 1725, the base station 105 may receive a signal from the UE that the second time interval is being used for performing the one or more signal characteristic measurements as described with reference to FIGS. 2-5. In certain examples, the operations of block 1725 may be performed by the signaling module 1115 as described with reference to FIG. 11.

At block 1730, the base station 105 may receive a signal from the UE indicating one or more of the signal characteristic measurements as described with reference to FIGS. 2-5. In certain examples, the operations of block 1730 may be performed by the signaling module 1115 as described with reference to FIG. 11.

At block 1735, the base station 105 may trigger a handover from a serving base station to a target base station responsive to the one or more signal characteristic measurements as described with reference to FIGS. 2-5. In certain examples, the operations of block 1735 may be performed by the BS mobility management module 1110 as described with reference to FIG. 11.

Thus, methods 1400, 1500, 1600, and 1700 may provide for mobility enhancements for high speed deployments. It should be noted that methods 1400, 1500, 1600, and 1700 describe possible implementation, and that the operations and the steps may be rearranged or otherwise modified such that other implementations are possible. In some examples, aspects from two or more of the methods 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a base station, comprising:
    identifying a first time interval for performing one or more signal characteristic measurements;
    identifying a second time interval for performing the one or more signal characteristic measurements, wherein the second time interval is shorter than the first time interval;
    identifying a first reference signal received power (RSRP) measurement at a first time and a second RSRP measurement at a second time, wherein the second time is later than the first time;
    identifying a difference between the first RSRP measurement and the second RSRP measurement;
    setting a mobility parameter threshold for changing from the first time interval to the second time interval based at least in part on the difference between the second RSRP measurement and the first RSRP measurement satisfying a threshold; and
    signaling a user equipment (UE) to indicate the mobility parameter threshold for use by the UE in changing from the first time interval to the second time interval for performing the one or more signal characteristic measurements.

2. The method of claim 1, wherein the first time interval and second time interval correspond to different periodicities of a discontinuous reception (DRX) cycle.

3. The method of claim 1, wherein the one or more signal characteristic measurements comprise one or more reference signal receive power (RSRP) measurements.

4. The method of claim 1, wherein the one or more signal characteristic measurements comprise one or more measurements associated with a radio link monitoring (RLM) process.

5. The method of claim 4, wherein the RLM process comprises evaluating a link quality of a link with a serving base station to trigger a connection re-establishment following a determination that the link quality is below a certain threshold.

6. The method of claim 1, wherein the mobility parameter threshold is based at least in part on a reference signal received power (RSRP) threshold.

7. The method of claim 1, wherein the mobility parameter threshold is based at least in part on one or more of a speed of the UE, or a number of visited cells within a time period.

8. The method of claim 1, wherein the changing from the first time interval to the second time interval is performed autonomously by the UE.

9. The method of claim 8, further comprising:
receiving a signal from the UE that the second time interval is being used for performing the one or more signal characteristic measurements.

10. The method of claim 8, further comprising:
receiving a signal from the UE that a discontinuous reception (DRX) cycle periodicity is changed at the UE.

11. The method of claim 9, further comprising:
receiving a signal from the UE indicating one or more of the signal characteristic measurements; and
triggering a handover from a serving base station to a target base station responsive to the one or more signal characteristic measurements.

12. A method for wireless communication at a user equipment (UE), comprising:
identifying a first time interval for performing one or more signal characteristic measurements;
determining a first reference signal received power (RSRP) measurement at a first time and a second RSRP measurement at a second time, wherein the second time is later than the first time;
determining a difference between the first RSRP measurement and the second RSRP measurement;
determining that a mobility parameter associated with the UE is outside of a mobility parameter threshold, wherein the mobility parameter threshold is based at least in part on the difference between the second RSRP measurement and the first RSRP measurement satisfying a threshold; and
changing, responsive to the determining, to a second time interval for performing the one or more signal characteristic measurements, wherein the second time interval is shorter than the first time interval.

13. The method of claim 12, wherein changing to a second time interval comprises changing a discontinuous reception (DRX) cycle from a first periodicity corresponding to the first time interval to a second periodicity corresponding to the second time interval.

14. The method of claim 12, wherein the one or more signal characteristic measurements comprise one or more reference signal receive power (RSRP) measurements.

15. The method of claim 12, wherein the one or more signal characteristic measurements comprise one or more measurements associated with a radio link monitoring (RLM) process.

16. The method of claim 15, wherein the RLM process comprises evaluating a link quality of a link with a serving base station to trigger a connection re-establishment following a determination that the link quality is below a RLM threshold.

17. The method of claim 12, wherein the changing from the first time interval to the second time interval is performed autonomously by the UE.

18. The method of claim 17, further comprising:
transmitting a signal to a serving base station that the second time interval is being used for performing the one or more signal characteristic measurements.

19. The method of claim 17, further comprising:
transmitting a signal to a serving base station that a discontinuous reception (DRX) cycle periodicity is changed at the UE.

20. The method of claim 12, further comprising:
triggering a handover from a serving base station to a target base station responsive to the one or more signal characteristic measurements.

21. The method of claim 12, wherein the mobility parameter threshold is based at least in part on one or more of a speed of the UE, or a number of visited cells within a time period.

22. The method of claim 12, wherein the mobility parameter threshold, the first time interval, and the second time interval are received in signaling from a base station.

23. The method of claim 12, further comprising:
receiving signaling from a serving base station indicating the mobility parameter threshold; and
performing the identifying, determining, and changing responsive to the signaling.

24. An apparatus for wireless communication, comprising:
a processor;
memory in electronic communication with the processor; and
instructions stored in the memory and operable, when executed by the processor, to cause the apparatus to:
identify a first time interval for performing one or more signal characteristic measurements;
determine a first reference signal received power (RSRP) measurement at a first time and a second RSRP measurement at a second time, wherein the second time is later than the first time;
determine a difference between the first RSRP measurement and the second RSRP measurement;
determine that a mobility parameter is outside of a mobility parameter threshold, wherein the mobility parameter threshold is based at least in part on the difference between the second RSRP measurement and the first RSRP measurement satisfying a threshold; and
change, responsive to the determining, to a second time interval for performing the one or more signal characteristic measurements, wherein the second time interval is shorter than the first time interval.

25. The apparatus of claim 24, wherein the mobility parameter threshold, the first time interval, and the second time interval are received in signaling from a base station.

26. The apparatus of claim 24, wherein the instructions are further operable to cause the apparatus to:
receive signaling from a serving base station indicating the mobility parameter threshold; and
perform the identifying, determining, and changing responsive to the signaling.

27. The apparatus of claim 24, wherein the mobility parameter threshold is based at least in part on one or more of a speed of a user equipment (UE), or a number of visited cells within a time period.

28. An apparatus for wireless communication, comprising:
a processor;
memory in electronic communication with the processor; and
instructions stored in the memory and operable, when executed by the processor, to cause the apparatus to:
identify a first time interval for performing one or more signal characteristic measurements;
identify a second time interval for performing the one or more signal characteristic measurements, wherein the second time interval is shorter than the first time interval;

identify a first reference signal received power (RSRP) measurement at a first time and a second RSRP measurement at a second time, wherein the second time is later than the first time;

identify a difference between the first RSRP measurement and the second RSRP measurement;

set a mobility parameter threshold for changing from the first time interval to the second time interval based at least in part on the difference between the second RSRP measurement and the first RSRP measurement satisfying a threshold; and signal a user equipment (UE) to indicate the mobility parameter threshold for use by the UE in changing from the first time interval to the second time interval for performing the one or more signal characteristic measurements.

29. The apparatus of claim 28, wherein the one or more signal characteristic measurements comprise one or more reference signal receive power (RSRP) measurements.

30. The apparatus of claim 28, wherein the mobility parameter threshold is based at least in part on one or more of a speed of the UE, or a number of visited cells within a time period.

\* \* \* \* \*